United States Patent
Wan

(10) Patent No.: US 12,027,888 B2
(45) Date of Patent: Jul. 2, 2024

(54) TRANSMITTING APPARATUS, RECEIVING APPARATUS, POWER SUPPLY DEVICE AND WIRELESS CHARGING METHOD

(71) Applicant: GUANGDONG OPPO MOBILE TELECOMMUNICATIONS CORP., LTD., Dongguan (CN)

(72) Inventor: Shiming Wan, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 513 days.

(21) Appl. No.: 17/324,807

(22) Filed: May 19, 2021

(65) Prior Publication Data

US 2021/0273497 A1 Sep. 2, 2021

Related U.S. Application Data

(63) Continuation of application No. PCT/CN2018/122753, filed on Dec. 21, 2018.

(51) Int. Cl.
*H02J 50/10* (2016.01)
*H02J 50/80* (2016.01)

(52) U.S. Cl.
CPC .............. *H02J 50/80* (2016.02); *H02J 50/10* (2016.02)

(58) Field of Classification Search
CPC .................................. H02J 50/80; H02J 50/10
See application file for complete search history.

(56) References Cited

U.S. PATENT DOCUMENTS

2012/0235506 A1* 9/2012 Kallal ............... H02J 50/50
307/104
2016/0056664 A1 2/2016 Partovi

FOREIGN PATENT DOCUMENTS

| CA | 3053269 A1 | 10/2018 |
| CN | 104810905 A | 7/2015 |
| CN | 206807107 U | 12/2017 |
| CN | 107623344 A | 1/2018 |
| CN | 108282000 A | 7/2018 |
| CN | 108448694 A | 8/2018 |
| CN | 108494030 A | 9/2018 |

(Continued)

OTHER PUBLICATIONS

Extended European Search Report dated Oct. 5, 2021 received in European Patent Application No. 18943436.8.

(Continued)

*Primary Examiner* — Robert Grant
(74) *Attorney, Agent, or Firm* — Sheppard, Mullin, Richter, & Hampton, LLP

(57) ABSTRACT

Provided are a transmitting apparatus, a receiving apparatus, a power supply device, and a wireless charging method. The transmitting apparatus includes: a wireless transmitting circuit configured to transmit a wireless charging signal; and a communication control circuit configured to receive a first feedback signal from the receiving apparatus, and to transmit a second feedback signal to the power supply device based on the first feedback signal. The first feedback signal is a feedback signal corresponding to an output current of a wireless receiving circuit, and the second feedback signal is used to trigger the power supply device to adjust at least one of an output voltage and an output current of the power supply device.

18 Claims, 6 Drawing Sheets

(56) References Cited

FOREIGN PATENT DOCUMENTS

EP 3399623 A1 11/2018
JP H07170668 A 7/1995

OTHER PUBLICATIONS

International Search Report and Written Opinion dated Aug. 26, 2019 in International Application No. PCT/ CN2018/122753. English translation attached.
The Exam Report dated Mar. 5, 2024 received in European Patent Application No. EP 18943436.8.

* cited by examiner

TRANSMITTING APPARATUS, RECEIVING APPARATUS, POWER SUPPLY DEVICE AND WIRELESS CHARGING METHOD

CROSS-REFERENCE TO RELATED APPLICATION

The present application is a continuation of International Application No. PCT/CN2018/122753, filed on Dec. 21, 2018, which is hereby incorporated by reference in its entirety.

TECHNICAL FIELD

The present disclosure relates to the field of wireless charging, and more specifically, to a transmitting apparatus, a receiving apparatus, a power supply device, and a wireless charging method.

BACKGROUND

At present, in the field of charging technologies, a device to be charged mainly adopts wired charging for charging.

Taking mobile phones as an example, currently, the mobile phones still take the wired charging as the main charging mode. Specifically, when a mobile phone needs to be charged, the mobile phone can be connected to a power supply device through a charging cable (such as a Universal Serial Bus (USB) cable), and output power of the power supply device can be transmitted to the mobile phone through the charging cable so as to charge a battery in the mobile phone.

For the device to be charged, the wired charging requires a use of the charging cable, resulting in complex operations in a preparation stage of charging. Therefore, wireless charging is becoming increasingly popular. However, the conventional wireless charging is ineffective and needs to be improved urgently.

SUMMARY

The present disclosure provides a transmitting apparatus, a receiving apparatus, a power supply device and a wireless charging method, capable of improving a charging effect of wireless charging.

In a first aspect, a transmitting apparatus is provided. The transmitting apparatus includes: a wireless transmitting circuit configured to transmit a wireless charging signal; and a communication control circuit configured to receive a first feedback signal from a receiving apparatus, and to transmit a second feedback signal to a power supply device based on the first feedback signal. The first feedback signal is a feedback signal corresponding to an output current of a wireless receiving circuit. The second feedback signal is used to trigger the power supply device to adjust at least one of an output voltage and an output current of the power supply device.

In a second aspect, a receiving apparatus is provided. The receiving apparatus includes: a wireless receiving circuit configured to receive a wireless charging signal from a transmitting apparatus, and to generate an output current of the wireless receiving circuit based on the wireless charging signal; and a communication control circuit configured to detect the output current of the wireless receiving circuit, and to transmit a first feedback signal to the transmitting apparatus. The first feedback signal is a feedback signal corresponding to the output current of the wireless receiving circuit. The first feedback signal is used to trigger the transmitting apparatus to adjust a magnitude of at least one of a voltage and a current corresponding to transmitting power of the wireless charging signal.

In a third aspect, a power supply device is provided. The power supply device includes a communication control circuit configured to receive a second feedback signal from a transmitting apparatus, and to adjust at least one of an output voltage and an output current of a power supply device based on the second feedback signal. The second feedback signal is a feedback signal corresponding to an output current of a wireless receiving circuit.

In a fourth aspect, a wireless charging method is provided. The wireless charging method includes: transmitting a wireless charging signal; and receiving a first feedback signal from a receiving apparatus, and transmitting a second feedback signal to a power supply device based on the first feedback signal. The first feedback signal is a feedback signal corresponding to an output current of a wireless receiving circuit. The second feedback signal is used to trigger the power supply device to adjust at least one of an output voltage and an output current of the power supply device.

In a fifth aspect, a wireless charging method is provided. The wireless charging method includes: receiving a wireless charging signal from a transmitting apparatus; generating an output current of a wireless receiving circuit based on the wireless charging signal; and detecting the output current of the wireless receiving circuit, and transmitting a first feedback signal to the transmitting apparatus. The first feedback signal is a feedback signal corresponding to the output current of the wireless receiving circuit. The first feedback signal is used to trigger the transmitting apparatus to adjust a magnitude of at least one of a voltage and a current corresponding to transmitting power of the wireless charging signal.

In a sixth aspect, a wireless charging method is provided. The wireless charging method includes: receiving a second feedback signal from a transmitting apparatus; and adjusting at least one of an output voltage and an output current of a power supply device based on the second feedback signal. The second feedback signal is a feedback signal corresponding to an output current of a wireless receiving circuit.

Technical solutions provided by the present disclosure can adaptively adjust the transmitting power of the wireless charging signal based on the output current of the wireless receiving circuit, thereby achieving a purpose of controlling an amount of heat generated by the wireless receiving circuit by controlling the output current of the wireless receiving circuit.

DESCRIPTION OF EMBODIMENTS

Generally, the conventional wireless charging technology connects a power supply device (such as an adapter) with a wireless charging apparatus (such as a wireless charging base), and transmits output power of the power supply device wirelessly (such as through electromagnetic waves) to a device to be charged by means of the wireless charging apparatus, thereby charging the device to be charged wirelessly.

According to principles of wireless charging, wireless charging is mainly divided into three types: magnetic coupling (or electromagnetic induction), magnetic resonance, and radio waves. Currently, mainstream wireless charging standards include a QI standard, a Power Matters Alliance (PMA) standard, and Alliance for Wireless Power (A4WP). Both the QI standard and the PMA standard use the magnetic coupling for wireless charging. The A4WP standard uses the magnetic resonance for wireless charging.

A wireless charging scheme according to an embodiment will be described below in combination with FIG. 1.

Figure 1:
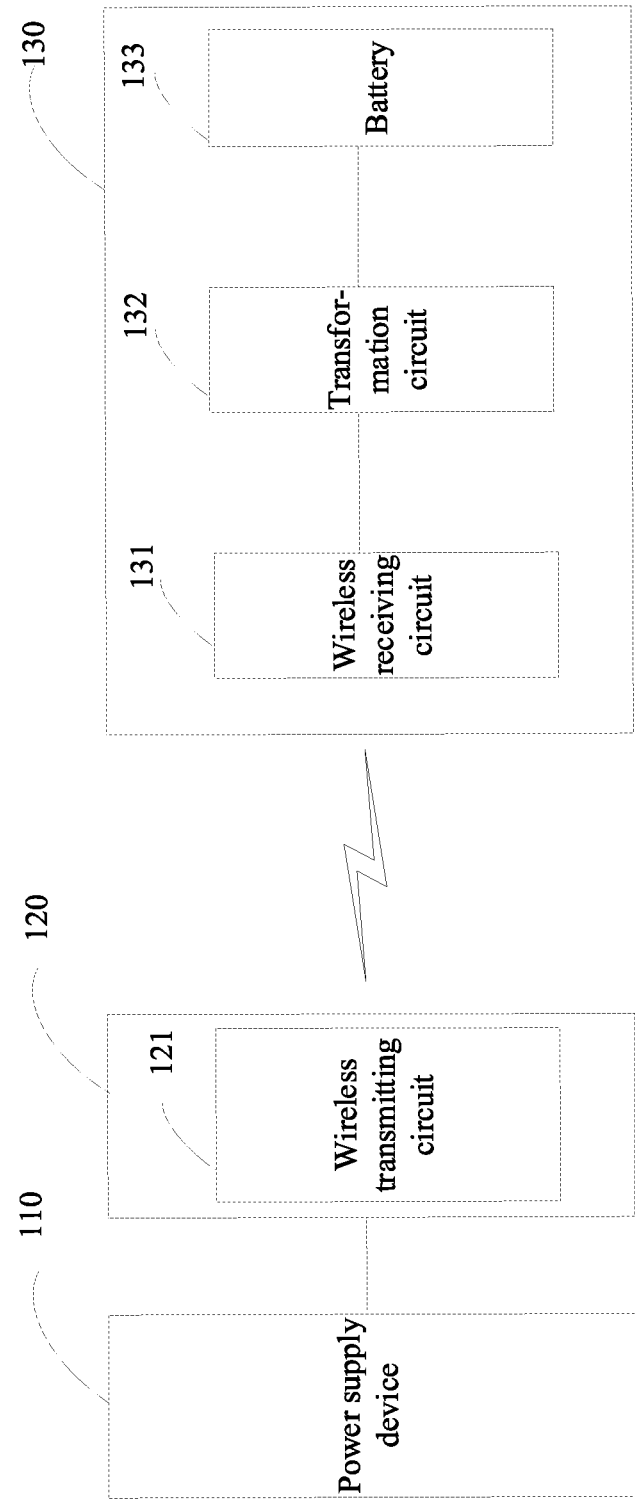
FIG. 1 is a schematic diagram illustrating a conventional wireless charging system.

As illustrated in FIG. 1, a wireless charging system includes a power supply device 110, a wireless charging apparatus 120, and a device to be charged 130. The wireless charging apparatus 120 may be, for example, a wireless charging base. The device to be charged 130 may be, for example, a terminal.

After the power supply device 110 is connected to the wireless charging apparatus 120, an output voltage and an output current of the power supply device 110 may be transmitted to the wireless charging apparatus 120.

The wireless charging apparatus 120 may convert, through a wireless transmitting circuit 121 inside the wireless charging apparatus 120, the output voltage and the output current of the power supply device 110 into a wireless charging signal (an electromagnetic signal) for transmission. For example, the wireless transmitting circuit 121 may convert the output current of the power supply device 110 into an alternating current, and convert the alternating current into the wireless charging signal through a transmitting coil or a transmitting antenna.

FIG. 1 only exemplarily gives a schematic diagram illustrating a structure of a wireless charging system, but embodiments of the present disclosure are not limited thereto. For example, the wireless charging apparatus 120 may also be a transmitting apparatus for a wireless charging signal, and the device to be charged 130 may also be a receiving apparatus for the wireless charging signal. The receiving apparatus for the wireless charging signal may be, for example, a chip having a function of receiving the wireless charging signal, such that the wireless charging signal transmitted by the wireless charging apparatus 120 may be received. The receiving apparatus for the wireless charging signal may also be a device to be charged.

The device to be charged may include, but not limited to, a device configured to receive/transmit a communication signal via a wired line connection (such as a Public Switched Telephone Network (PSTN), a Digital Subscriber Line (DSL), a digital cable, a direct cable connection, and/or another data connection/network) and/or via a wireless interface (of, for example, a cellular network, a Wireless Local Area Network (WLAN), a digital television network such as a Digital Video Broadcasting Handheld (DVB-H) network, a satellite network, an Amplitude Modulation-Frequency Modulation (AM-FM) broadcast transmitter, and/or another communication terminal). A terminal configured to communicate through a wireless interface may be referred to as a "wireless communication terminal", a "wireless terminal", and/or a "mobile terminal". Examples of a mobile terminal include, but not limited to, a satellite phone or a cellular phone; a Personal Communication System (PCS) terminal that can combine a cellular radiotelephone with capabilities of data processing, facsimile and data communication; a Personal Digital Assistant (PDA) that can include a radiotelephone, a pager, an Internet/intranet access, a web browser, a notepad, a calendar, and/or a Global Positioning System (GPS) receiver; and a conventional laptop and/or palmtop receiver, or other electronic apparatuses including a radiotelephone transceiver. In some embodiments, the device to be charged may refer to a mobile terminal device or a handheld terminal device, such as a mobile phone, a pad, and the like. In some embodiments, the device to be charged mentioned in this embodiment of the present disclosure may be a chip system. In these embodiments, a battery of the device to be charged may or may not belong to the chip system.

The following description will be made by taking the wireless charging apparatus and the device to be charged as an example.

The device to be charged 130 may receive a wireless charging signal transmitted by the wireless transmitting circuit 121 through a wireless receiving circuit 131, and convert the wireless charging signal into an output voltage and an output current of the wireless receiving circuit 131. For example, the wireless receiving circuit 131 may convert the wireless charging signal transmitted by the wireless transmitting circuit 121 into an alternating current through a receiving coil or a receiving antenna, and perform operations such as rectification and/or filtering on the alternating current, so as to convert the alternating current into the output voltage and the output current of the wireless receiving circuit 131.

In some embodiments, before wireless charging, the wireless charging apparatus 120 may pre-negotiate transmitting power of the wireless transmitting circuit 121 with the device to be charged 130. Assuming that power negotiated between the wireless charging apparatus 120 and the device to be charged 130 is 5 W, the output voltage and the output current of the wireless receiving circuit 131 are generally 5V and 1 A, respectively. Assuming that the power negotiated between the wireless charging apparatus 120 and the device to be charged 130 is 10.8 W, the output voltage and the output current of the wireless receiving circuit 131 are generally 9V and 1.2 A, respectively.

If the output voltage of the wireless receiving circuit 131 is not suitable for being applied to two ends of a battery 133 directly, it is necessary to perform constant voltage and/or constant current control through a transformation circuit 132 in the device to be charged 130, so as to obtain an expected charging voltage and/or an expected charging current of the battery 133 in the device to be charged 130.

The transformation circuit 132 may be configured to convert the output voltage of the wireless receiving circuit 131, in such a manner that an output voltage and/or an output current of the transformation circuit 132 meet requirements of the expected charging voltage and/or the expected charging current of the battery 133.

As an example, the transformation circuit 132 may be, for example, a charging Integrated Circuit (IC), or a power management circuit. During a charging process of the battery 133, the transformation circuit 132 may be used to manage the charging voltage and/or the charging current of the battery 133. The transformation circuit 132 may include a voltage feedback function and/or a current feedback function to achieve management of the charging voltage and/or the charging current of the battery 133.

In some embodiments, the charging process of the battery may include one or more of a trickle charging stage, a constant-current charging stage, and a constant-voltage charging stage. In the trickle charging stage, the transformation circuit 132 may use the current feedback function to allow a current entering the battery 133 during the trickle charging stage to meet a magnitude of the expected charging current (for example, a first charging current) of the battery 133. In the constant-current charging stage, the transformation circuit 132 may use the current feedback function to allow a current entering the battery 133 during the constant-current charging stage to meet a magnitude of the expected charging current (for example, a second charging current, which may be greater than the first charging current) of the battery 133. In the constant-voltage charging stage, the transformation circuit 132 may use the voltage feedback function to allow a magnitude of a voltage applied to the two ends of the battery 133 during the constant-voltage charging stage to meet a magnitude of the expected charging voltage of the battery 133.

As an example, when the output voltage of the wireless receiving circuit 131 is greater than the expected charging voltage of the battery 133, the transformation circuit 132 may be used to reduce the output voltage of the wireless receiving circuit 131, in such a manner that a charging voltage obtained after the voltage reduction meets the requirement of the expected charging voltage of the battery 133. As another example, when the output voltage of the wireless receiving circuit 131 is smaller than the expected charging voltage of the battery 133, the transformation circuit 132 may be used to increase the output voltage of the wireless receiving circuit 131, in such a manner that a charging voltage obtained after the voltage increasing meets the requirement of the expected charging voltage of the battery 133.

As another example, the wireless receiving circuit 131 outputs a 5V constant voltage. When the battery 133 includes a single battery cell, the transformation circuit 132 (for example, a Buck circuit) may perform reduce the output voltage of the wireless receiving circuit 131, in such a manner that a charging voltage obtained after the voltage reduction meets the requirement of the expected charging voltage of the battery 133.

As another example, the wireless receiving circuit 131 outputs a 5V constant voltage. When the battery 133 includes two or more battery cells connected in series, the transformation circuit 132 (such as a Boost circuit) may increase the output voltage of the wireless receiving circuit 131, in such a manner that a charging voltage obtained after the voltage increasing meets the requirement of the expected charging voltage of the battery 133.

Restricted by low power conversion efficiency (also referred to as energy conversion efficiency, or circuit conversion efficiency) of the transformation circuit 132, unconverted electric energy is lost in a form of heat. The heat will be accumulated inside the device to be charged 130. Since both a design space and a heat dissipation space of the device to be charged 130 are very small (for example, a physical size of a mobile terminal used by a user is getting lighter and thinner while a large number of electronic components are densely arranged in the mobile terminal to improve performance of the mobile terminal), the difficulty of designing the transformation circuit 132 is increased, and it is difficult to dissipate the heat accumulated in the device to be charged 130 in time, thereby causing an abnormality of the device to be charged 130.

As an example, the heat accumulated on the transformation circuit 132 may cause thermal interference to electronic components near the transformation circuit 132, which may result in abnormal operations of the electronic components. As another example, the heat accumulated on the transformation circuit 132 may shorten service lives of the transformation circuit 132 and the electronic components near the transformation circuit 132. As a further example, the heat accumulated on the transformation circuit 132 may exert thermal interference on the battery 133, which may cause abnormal charging and discharging of the battery 133. As yet another example, the heat accumulated on the transformation circuit 132 may raise a temperature of the device to be charged 130, such that use experience during charging of a user may be affected. As still another example, the heat accumulated on the transformation circuit 132 may cause a short circuit of the transformation circuit 132, such that the output voltage of the wireless receiving circuit 131 may be applied to the two ends of the battery 133 directly, thereby leading to abnormal charging. If the battery 133 is in an overvoltage charging state for a long time, an explosion of the battery 133 may even be triggered, thereby endangering the safety of the user.

Generally speaking, the larger a voltage difference between an input voltage and the output voltage of the transformation circuit 132 is, the lower buck conversion efficiency will be, and the more serious heat generation will be. Adopting a high-voltage-based wireless signal transmission mode will inevitably lead to a large voltage difference between the input voltage and the output voltage of the transformation circuit 132. Therefore, in order to reduce the voltage difference between the input voltage and the output voltage of the transformation circuit, more and more devices to be charged adopt a low-voltage and high-current mode to charge the battery. However, a large charging current will cause a large amount of heat to be accumulated at the wireless receiving circuit 131.

As an example, charging power is equal to 20 W. In order to reduce heat generated by the transformation circuit 132, the wireless charging apparatus 120 may output the charging power in the low-voltage and high-current mode, for example, a charging power of 5V/4 A. Correspondingly, the wireless receiving circuit 131 may convert a wireless charging signal into an output voltage/output current of 5V/4 A. However, a large current will cause a transmitting coil of the wireless transmitting circuit 121 and a receiving coil of the wireless receiving circuit 131 to generate a large amount of heat during transmission of electric energy. The heat generated during charging will affect a charging speed and a service life of a product, and reduce reliability of the product.

In summary, it is an urgent problem to reduce heat generated during wireless charging.

In some related technologies, in order to reduce heat generated by a coil during the wireless charging, a low charging power mode is adopted. For example, the wireless charging apparatus 120 only outputs charging power of up to 7.5 W to charge the device to be charged 130. In such charging mode, the charging is slow, and thus it takes a long time to fully charge the device to be charged 130.

In other related technologies, in order to speed up the charging speed, compared with the low charging power mode, the wireless charging apparatus 120 increases the charging power (for example, increasing the charging power from 7.5 W to 10 W) for wireless charging. However, such a charging mode does not reduce charging time to an expected duration (for example, smaller than 100 minutes). As described above, when high power is used for the wireless charging, the coil or the transformation circuit 132 will inevitably generate heat. In a system that uses the magnetic coupling for the wireless charging, a distance between the wireless charging apparatus 120 and the device to be charged 130 is usually very small, such that the coil of the wireless charging apparatus 120 generating heat transfers the heat to the device to be charged 130. For the device to be charged 130, the heat generated by the coil and the transformation circuit will be conveyed to the battery to a certain extent. In addition, with heat generated by the battery during the charging process, a temperature of the battery may easily exceed a safe range of charging. When the heat generated by the coil, the transformation circuit and the battery is outside the safe range, it is needed to return to the low charging power (for example, 7.5 W) mode or suspend charging to ensure the safety of charging. Therefore, in the related art, although the maximum charging power of the wireless charging is increased, a duration of charging with the maximum charging power is very short, and wireless charging with high power in a short period of time cannot shorten the charging time to an expected value.

In addition, in order to reduce heat generation, heat dissipation technologies using e.g., graphene and a heat dissipation plate to dissipate heat during the charging process may be adopted in the related art. However, these heat dissipation technologies do not have ideal effects, and also, increase costs of the product, occupy an internal space in the product, and affect an appearance of the product.

In order to solve the above problems, embodiments of the present disclosure provide a wireless charging system. The wireless charging system may include a transmitting apparatus (for example, the above wireless charging apparatus) for a wireless charging signal and a receiving apparatus (for example, the above device to be charged) for the wireless charging signal. The transmitting apparatus for the wireless charging signal and the receiving apparatus for the wireless charging signal can communicate with each other wirelessly. In addition, transmitting power of the transmitting apparatus for the wireless charging signal can be adjusted based on a feedback signal transmitted by the receiving apparatus for the wireless charging signal, in such a manner that the transmitting power of the transmitting apparatus for the wireless charging signal may match a charging voltage and/or a charging current currently required by the battery. In this manner, on a basis of charging requirements of the receiving apparatus for the wireless charging signal, wireless charging power can be increased and the charging speed can be increased.

Also, in order to prevent the output current of the wireless receiving circuit from being too large, the receiving apparatus for the wireless charging signal can also offer feedback to the output current of the wireless receiving circuit. In this way, the transmitting apparatus for the wireless charging signal can adjust the transmitting power based on a feedback signal of the output current of the wireless receiving circuit, in such a manner that the output current of the wireless receiving circuit meets a preset condition.

Controlling the output current of the wireless receiving circuit by the transmitting apparatus for the wireless charging signal may control the heat generated by the wireless transmitting circuit (including the transmitting coil) and the wireless receiving circuit (including the receiving coil), thereby reducing the heat generated during the charging process. Consequently, compared with the related art, the duration of high-power wireless charging can be prolonged, the charging speed can be increased, and the charging time can be shortened. The wireless charging system according to an embodiment of the present disclosure, which can control the heat generated during the charging process by controlling the output current of the wireless receiving circuit, will be described below in combination with FIG. 2.

Figure 2:
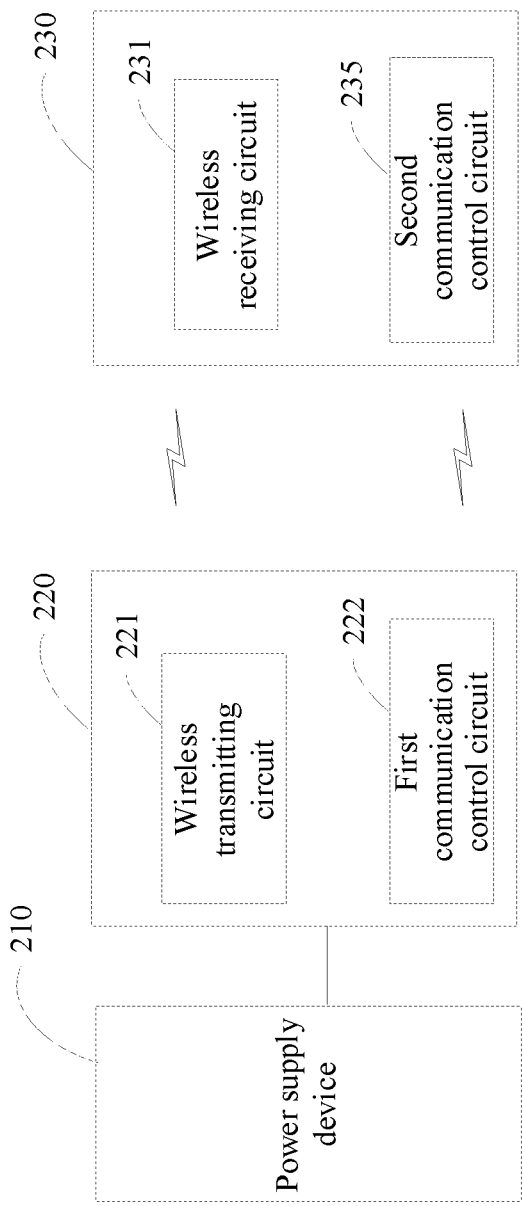
FIG. 2 is a schematic diagram illustrating a structure of a wireless charging system according to an embodiment of the present disclosure.

As illustrated in FIG. 2, the wireless charging system according to an embodiment of the present disclosure includes a power supply device 210, a transmitting apparatus 220 for a wireless charging signal, and a receiving apparatus 230 for the wireless charging signal.

The power supply device 210 according to the embodiment of the present disclosure may be a power supply device with adjustable output power. The power supply device 210 can adjust the output power based on a charging state of the battery and/or the output current of the wireless receiving circuit.

The transmitting apparatus 220 for the wireless charging signal may include a wireless transmitting circuit 221 and a first communication control circuit 222. A control function in the first communication control circuit 222 may be implemented by, for example, a Micro Control Unit (MCU).

The receiving apparatus 230 for the wireless charging signal may include a wireless receiving circuit 231 and a second communication control circuit 235. The wireless receiving circuit 231 may be configured to receive a wireless charging signal transmitted by the wireless transmitting circuit 221 for charging the battery. The second communication control circuit 235 may be configured to communicate with the first communication control circuit 222, thereby facilitating the first communication control circuit 222 adjusting output power of the wireless charging signal. A control function in the second communication control circuit 235 may be implemented by, for example, an MCU.

It is to be understood that the transmitting apparatus for the wireless charging signal may also be referred to as a transmitting apparatus for short, and the receiving apparatus for the wireless charging signal may also be referred to as a receiving apparatus for short.

The wireless transmitting circuit 221 may be configured to transmit a wireless charging signal, so as to charge the receiving apparatus 230 for the wireless charging signal. In some embodiments, the wireless transmitting circuit 221 may include a wireless transmitting drive circuit and a transmitting coil or a transmitting antenna. The wireless transmitting drive circuit may be configured to generate a high-frequency alternating current. The transmitting coil or the transmitting antenna may be configured to convert the high-frequency alternating current into an electromagnetic signal for transmission.

The first communication control circuit 222 may have a communication function, and may be used for wireless communication with the receiving apparatus 230 for the wireless charging signal during wireless charging. More specifically, the first communication control circuit 222 may communicate with the second communication control circuit 235. The receiving apparatus 230 for the wireless charging signal may be the device to be charged, or may be the chip having the function of receiving wireless charging signals.

Embodiments of the present disclosure do not specifically limit a communication mode between the first communication control circuit 222 and the receiving apparatus 230 for the wireless charging signal and communication information exchanged between the first communication control circuit 222 and the receiving apparatus 230 for the wireless charging signal. Detailed description will be given below in combination with specific embodiments.

A wireless charging signal transmitted by the wireless transmitting circuit 221 may be received by the wireless receiving circuit 231. The wireless receiving circuit 231 may convert the received wireless charging signal into an output current and an output voltage of the wireless receiving circuit 231.

A detection circuit in the receiving apparatus 230 for the wireless charging signal may detect the output current of the wireless receiving circuit 231. The second communication control circuit 235 may communicate with the first communication control circuit 222 based on the detected output current of the wireless receiving circuit 231, and transmit a first feedback signal to the first communication control circuit 222.

As mentioned above, the magnitude of the output current in each of the wireless transmitting circuit 221 and the wireless receiving circuit 231 is a key factor that affects the heat generated in the wireless charging. In an embodiment of the present disclosure, the first communication control circuit 222 may adjust the transmitting power of the wireless charging signal based on the received feedback signal corresponding to the output current of the wireless receiving circuit, in such a manner that the output current of the wireless receiving circuit meets a preset condition.

After receiving the first feedback signal transmitted by the receiving apparatus 230 for the wireless charging signal, the first communication control circuit 222 may adjust the transmitting power of the wireless charging signal, in such a manner that the output current of the wireless receiving circuit meets the preset condition.

Adjusting the transmitting power of the wireless charging signal may refer to adjusting the magnitude of the voltage and/or the current corresponding to the transmitting power of the wireless charging signal based on the first feedback signal. The magnitude of the voltage and/or the current corresponding to the transmitting power of the wireless charging signal can be understood as a magnitude of the output voltage and/or the output current of the wireless charging signal transmitted by the wireless transmitting circuit after being received by the wireless receiving circuit and then converted by the wireless receiving circuit.

Adjusting the transmitting power of the wireless charging signal may be adjusting a relationship between a voltage and a current corresponding to the transmitting power of the wireless charging signal when the transmitting power of the wireless charging signal is constant. For example, when the transmitting power is constant, the current can be reduced by increasing the voltage.

Adjusting the transmitting power of the wireless charging signal by the first communication control circuit 222 may refer to that the first communication control circuit 222 adjusts the transmitting power of the wireless charging signal by controlling output power of the power supply device 210.

Controlling the output power of the power supply device 210 by the first communication control circuit 222 may refer to that the first communication control circuit 222 controls an output voltage and/or an output current of the power supply device 210.

For example, after receiving the first feedback signal, the first communication control circuit may transmit a second feedback signal to the power supply device to instruct the power supply device to adjust the output voltage and/or the output current, in such a manner that the output voltage and/or the output current of the power supply device meet requirements of the wireless receiving circuit for the output current.

According to an embodiment of the present disclosure, control for adjusting the transmitting power of the transmitting apparatus for the wireless charging signal is delegated to the power supply device, which adjusts the transmitting power of the wireless charging signal by changing the output voltage and/or the output current. An advantage of such adjustment is that power provided by the power supply device 210 is exactly equal to power required by the transmitting apparatus 220 for the wireless charging signal, and thus there is no waste of power. Consequently, power conversion efficiency can be improved. Compared with related technologies, the heat generated during the charging process is reduced, and the charging speed is increased.

In this case, the output power of the power supply device may match a requirement of the receiving apparatus for the wireless charging signal. The transmitting apparatus for the wireless charging signal may directly convert the output power of the power supply device into a wireless charging signal for transmission, without adjusting the output power of the power supply device. Therefore, the transmitting apparatus for the wireless charging signal does not need to be provided with a voltage conversion circuit, thereby simplifying the design of the transmitting apparatus for the wireless charging signal and reducing the heat generated by the transmitting apparatus for the wireless charging signal. Therefore, it is also possible to avoid heat generation of the receiving apparatus for the wireless charging signal due to the heat generated by the transmitting apparatus for the wireless charging signal being transmitted to the receiving apparatus for the wireless charging signal.

The embodiments of the present disclosure do not specifically limit a communication mode between the first communication control circuit 222 in the transmitting apparatus 220 for the wireless charging signal and the second communication control circuit 235 in the receiving apparatus 230 for the wireless charging signal.

In some embodiments, the first communication control circuit 222 and the second communication control circuit 235 may communicate with each other in a wireless communication mode such as Bluetooth communication, Wireless Fidelity (Wi-Fi) communication or backscatter modulation (or power load modulation) communication, short-range wireless communication based on a high carrier frequency, optical communication, ultrasonic communication, ultra-wideband communication or mobile communication.

In an embodiment, a short-range wireless communication module based on a high carrier frequency may include an Integrated Circuit (IC) chip having an Extremely High Frequency (EHF) antenna encapsulated therein. In at least one embodiment, the high carrier frequency may be 60 GHz.

In an embodiment, the optical communication may be communication using an optical communication module. The optical communication module may include an infrared communication module. The infrared communication module may use infrared rays to transmit information.

In an embodiment, the mobile communication may be communication using a mobile communication module. The mobile communication module may use a mobile communication protocol such as a 5th-Generation (5G) communication protocol, a 4th-Generation (4G) communication protocol, or a 3rd-Generation (3G) communication protocol for information transmission.

Compared with the Qi standard in which signal modulation is used for coupling to the coil of the wireless receiving circuit for communication, the above wireless communication modes may improve reliability of communication, while avoiding voltage ripples due to signal coupling communication, which would otherwise affect a voltage processing process of the buck circuit.

In at least one embodiment, the first communication control circuit 222 and the second communication control circuit 235 may also communicate with each other in a wired communication mode, for example, through a data interface.

The embodiments of the present disclosure do not specifically limit the communication mode between the first communication control circuit 222 in the transmitting apparatus 220 for the wireless charging signal and the power supply device 210. Similar to the communication mode between the first communication control circuit 222 and the second communication control circuit 235, communication between the first communication control circuit 222 and the power supply device 210 may also adopt any of the methods described above.

In an embodiment of the present disclosure, the transmitting apparatus 220 for the wireless charging signal may serve as a bridge for communication between the power supply device 210 and the receiving apparatus 230 for the wireless charging signal, and is mainly responsible for forwarding information therebetween.

For example, in the wireless charging, the first communication control circuit 222 communicates with the receiving apparatus 230 for the wireless charging signal to determine whether the output voltage and/or the output current of the power supply device 210 needs to be adjusted. When the output voltage and/or the output current of the power supply device 210 needs to be adjusted, the first communication control circuit 222 communicates with the power supply device 210 to instruct the power supply device 210 to adjust the output voltage and/or the output current of the power supply device 210.

As another example, in the wireless charging, the first communication control circuit 222 in the transmitting apparatus 220 for the wireless charging signal performs wireless communication with the receiving apparatus 230 for the wireless charging signal to obtain adjustment information. The adjustment information is used to indicate adjustment of the output voltage and/or the output current of the power supply device 210. The first communication control circuit 222 communicates with the power supply device 210, and transmits the adjustment information to the power supply device 210, such that the power supply device 210 may adjust the output voltage and/or the output current of the power supply device based on the adjustment information.

It is to be understood that, similar to the communication mode between the transmitting apparatus 220 for the wireless charging signal and the receiving apparatus 230 for the wireless charging signal, communication between the transmitting apparatus 220 for the wireless charging signal (or the first communication control circuit 222) and the power supply device 210 may be one-way communication or two-way communication, and is not limited in the embodiments of the present disclosure.

It is also to be understood that the output current of the power supply device may be a constant direct current, a pulsating direct current, or an alternating current, and is not limited in the embodiments of the present disclosure.

Embodiments of the present disclosure do not limit specific content of the first feedback signal.

As an example, the first feedback signal may include the magnitude of the output current of the wireless receiving circuit 231, and may also include a difference between the output current of the wireless receiving circuit 231 and a target value. The target value may be a target maximum value, that is, a preset maximum value of the output current of the wireless receiving circuit 231. When the output current of the wireless receiving circuit is outside the target value, it means that heat generation of the wireless receiving circuit 231 will be serious.

After receiving the magnitude of the output current of the wireless receiving circuit 231, the first communication control circuit 222 may control the power supply device 210 to adjust the output voltage and/or the output current based on the magnitude of the output current of the wireless receiving circuit 231.

It is to be understood that when power required by the receiving apparatus 230 for the wireless charging signal is constant, the output current of the wireless receiving circuit 231 can be reduced by increasing the output voltage of the power supply device 210.

For example, when the first feedback signal indicates that the magnitude of the output current of the wireless receiving circuit 231 is an output current greater than 2 A, the first communication control circuit 222 may increase the output voltage of the power supply device 210 to reduce the output current of the wireless transmitting circuit 221.

After receiving the difference between the output current of the wireless receiving circuit 231 and the target value, the first communication control circuit 222 may control the power supply device 210 to adjust the output voltage and/or the output current based on the difference.

For example, if the first feedback signal indicates that the output current of the wireless receiving circuit 231 is higher than the target value, the first communication control circuit 222 may increase the output voltage of the power supply device 210. If the first feedback signal indicates that the output current of the wireless receiving circuit is lower than the target value, the first communication control circuit 222 may not adjust the output voltage and/or the output current of the wireless transmitting circuit.

As another example, the first feedback signal may indicate the difference between the output current of the wireless receiving circuit 231 and the target value. When the difference is large, the first communication control circuit 222 may perform a wide range of adjustment on the output voltage of the power supply device 210. When the difference is small, the first communication control circuit 222 may perform a small range of adjustment on the output voltage of the power supply device 210. More specifically, the output voltage of the power supply device 210 may be of different levels. When the difference between the output current of the wireless receiving circuit 231 and the target value is large, the first communication control circuit 222 may adjust the output voltage of the power supply device 210 by several levels. A voltage of each level may be set to a fixed value, such as 10 mV, 20 mV, and the like. When the difference between the output current of the wireless receiving circuit 231 and the target value is small, the first communication control circuit 222 may adjust the output voltage of the power supply device 210 by one level.

For example, when the first feedback signal indicates that the output current of the wireless receiving circuit 231 is greater than the target value by 1 A, the first communication control circuit 222 may increase the output voltage of the power supply device 210 by a relatively great rise. For example, the output voltage of the power supply device 210 may be adjusted by two levels. When the first feedback signal indicates that the output current of the wireless receiving circuit 231 is greater than the target value by 0.5 A, the first communication control circuit 222 may increase the output voltage of the power supply device 210 by a relatively small rise. For example, the output voltage of the power supply device 210 may be adjusted by one level.

As another example, the first feedback signal may also include the adjustment information, so as to instruct the wireless transmitting circuit to increase or decrease the output voltage. For example, the first feedback signal may instruct the first communication control circuit 222 to increase the output voltage of the wireless transmitting circuit 221. As another example, the first feedback signal may instruct the first communication control circuit 222 to decrease the output voltage of the wireless transmitting circuit 221.

It is to be understood that the first feedback signal may also include any combination of the various situations described above. For example, the first feedback signal may include the magnitude of the output current of the wireless receiving circuit 231, and the difference between the magnitude of the output current of the wireless receiving circuit 231 and the target value. As another example, the first feedback signal may include the difference between the magnitude of the output current of the wireless receiving circuit 231 and the target value, and the adjustment information for increasing or decreasing the output voltage of the wireless transmitting circuit 221.

It is to be understood that when the transmitting power of the wireless transmitting circuit 221 is constant, there is an inverse proportional relationship between the output voltage and the output current of the wireless receiving circuit 231. Therefore, the first feedback signal described above may also include information related to the output voltage of the wireless receiving circuit 231.

Similarly, the embodiments of the present disclosure do not limit specific content of the second feedback signal. The specific content of the second feedback signal may be similar to the content of the first feedback signal. The content of the second feedback signal may be the same as or different from the content of the first feedback signal.

When the content of the second feedback signal is the same as the content of the first feedback signal, this means that the transmitting apparatus 220 for the wireless charging signal may directly forward the content of the first feedback signal to the power supply device 210 after receiving the first feedback signal transmitted by the receiving apparatus 230 for the wireless charging signal, so as to control the power supply device 210 to adjust the output voltage and/or the output current.

For example, each of the first feedback signal and the second feedback signal may include the magnitude of the output current of the wireless receiving circuit 231, or the difference between the output current of the wireless receiving circuit 231 and the target value. After the power supply device 210 receives the second feedback signal, the output voltage and/or the output current of the power supply device 210 may be adjusted based on the output current of the wireless receiving circuit 231, in such a manner that the output current of the wireless receiving circuit meets the preset condition.

As another example, each of the first feedback signal and the second feedback signal may include the adjustment information. The power supply device 210 may adjust the output voltage of the power supply device 210 directly based on information of increasing or decreasing the output voltage indicated by the adjustment information. Consequently, instead of undergoing feedback and confirmation for several times, the power supply device may adjust the output voltage of the power supply device to a required voltage through a single feedback, thereby saving loop response time.

When the content of the second feedback signal is different from the content of the first feedback signal, this means that the transmitting apparatus 220 for the wireless charging signal may convert the received first feedback signal into the second feedback signal, and then transmit the second feedback signal to the power supply device 210.

For example, the first feedback signal may include the magnitude of the output current of the wireless receiving circuit 231, and/or the difference between the output current of the wireless receiving circuit 231 and the target value. After receiving the first feedback signal, the receiving apparatus 230 for the wireless charging signal may convert the content of the first feedback signal into the adjustment information, so as to instruct the power supply device 210 to increase or decrease the output voltage. After receiving the second feedback signal, the power supply device 210 may adjust the output voltage directly based on the adjustment information included in the second feedback signal. Consequently, instead of undergoing feedback and confirmation for several times, the power supply device may adjust the output voltage of the power supply device to the required voltage through a single feedback, thereby saving the loop response time.

With the technical solution according to the embodiments of the present disclosure, the receiving apparatus for the wireless charging signal (such as the device to be charged) may detect the output current of the wireless receiving circuit. When the output current of the wireless receiving circuit is outside a preset range, the device to be charged may notify the transmitting apparatus for the wireless charging signal (such as a wireless charging base). The wireless charging base may notify the power supply device (such as an adapter), and control the output current of the wireless receiving circuit by controlling a magnitude of an output voltage of the adapter, in such a manner that the output current of the wireless receiving circuit meets requirements, thereby controlling the heat generated by the wireless receiving circuit. Consequently, compared with related technologies, a duration of high-power (for example, 15 W) wireless charging can be prolonged, the charging speed can be increased, and the charging time can be shortened.

According to embodiments of the present disclosure, a voltage adjustment function is transferred to the power supply device. The transmitting apparatus for the wireless charging signal communicates with the power supply device. The power supply device adjusts the output voltage. The transmitting apparatus for the wireless charging signal does not need to be provided with a voltage transformation circuit, thereby simplifying the design of the transmitting apparatus for the wireless charging signal while controlling the heat generated by the transmitting apparatus for the wireless charging signal.

Figure 3:
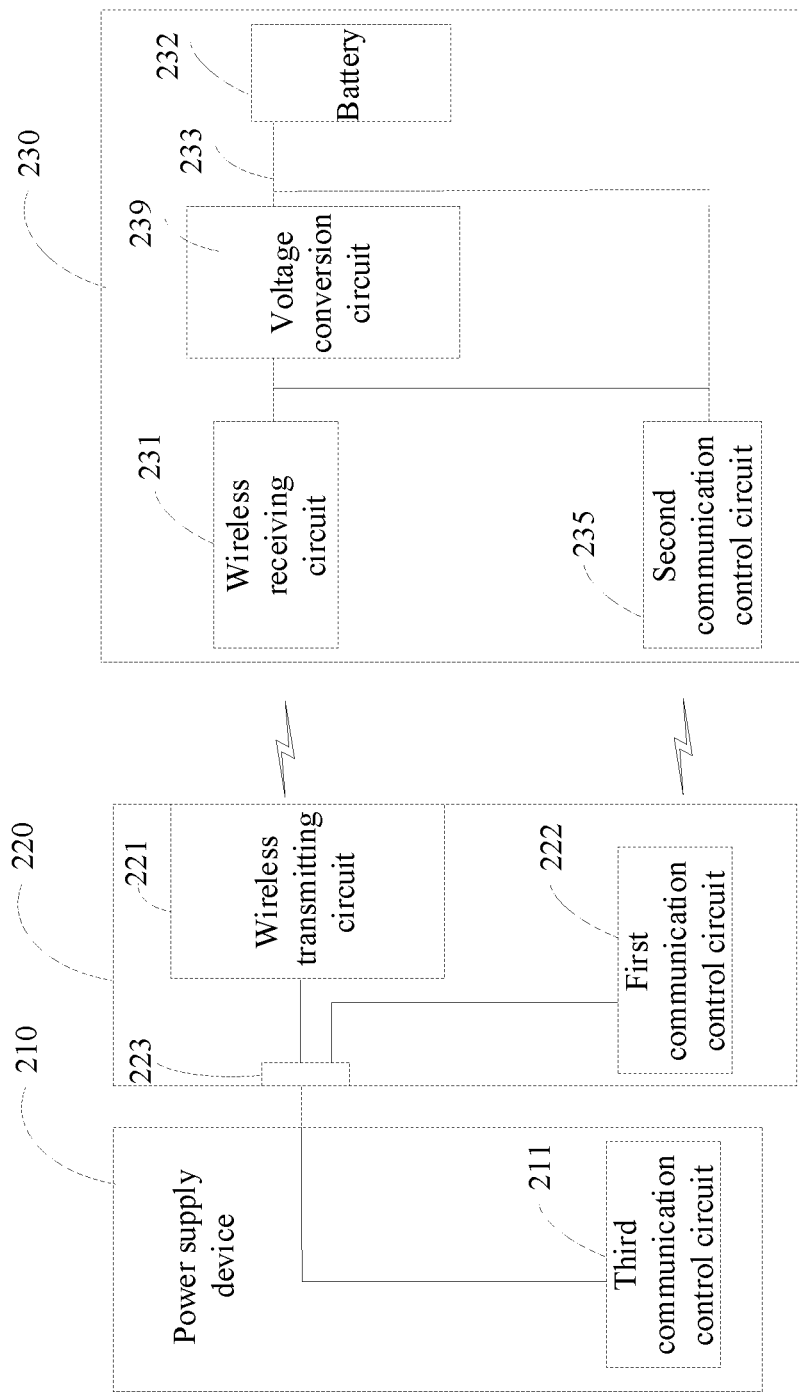
FIG. 3 is a schematic diagram illustrating a structure of a wireless charging system according to another embodiment of the present disclosure.

In at least one embodiment, as illustrated in FIG. 3, the transmitting apparatus 220 for the wireless charging signal may further include a charging interface 223. The charging interface 223 may be configured to be connected to the power supply device 210 external to the charging interface 223. The wireless transmitting circuit 221 may be further configured to generate the wireless charging signal based on the output voltage and the output current of the power supply device 210.

The power supply device 210 may further include a third communication control circuit 211. The third communication control circuit 211 is configured to communicate with the second communication control circuit 235. For example, the third communication control circuit 211 may receive a feedback signal transmitted by the second communication control circuit 235, and adjust the output voltage and/or the output current of the power supply device 210 based on the feedback signal.

In at least one embodiment, the third communication control circuit 211 in the power supply device 210 may be configured to receive the second feedback signal from the transmitting apparatus 220 for the wireless charging signal, and adjust the output voltage and/or the output current of the power supply device 210 based on the second feedback signal. The second feedback signal is a feedback signal corresponding to the output current of the wireless receiving circuit 231.

In at least one embodiment, the third communication control circuit 211 is further configured to receive a fourth feedback signal from the transmitting apparatus 220 for the wireless charging signal, and adjust the output power of the power supply device 210 based on the fourth feedback signal. The fourth feedback signal is a feedback signal corresponding to charging information of the battery. The charging information of the battery includes at least one of the following information: a charging voltage, a charging current, a current battery level, and a current voltage.

Reference may be made to the above description for specific content of each of the second feedback signal and the fourth feedback signal, details of which will be omitted here.

According to an embodiment of the present disclosure, the output power of the power supply device 210 may be adjustable. The first communication control circuit 222 may adjust the output power of the power supply device 210 based on requirements of the receiving apparatus 230 for the wireless charging signal.

The present disclosure does not specifically limit a type of the power supply device 210. For example, the power supply device 210 may be a device such as an adapter, a power bank, a car charger, or a computer.

The present disclosure does not specifically limit a type of the charging interface 223. In some embodiments, the charging interface 223 may be a Universal Serial Bus (USB) interface. The USB interface may be, for example, a USB 2.0 interface, a micro USB interface, or a USB TYPE-C interface. In other embodiments, the charging interface 223 may also be a lightning interface, or any other type of parallel port and/or serial port that can be used for charging.

The embodiments of the present disclosure do not specifically limit the communication mode between the first communication control circuit 222 and the power supply device 210. As an example, the first communication control circuit 222 may be connected to the power supply device 210 through a communication interface other than the charging interface, and communicate with the power supply device 210 through the communication interface. As another example, the first communication control circuit 222 may communicate with the power supply device 210 in a wireless manner. For example, the first communication control circuit 222 may perform Near Field Communication (NFC) with the power supply device 210. As another example, the first communication control circuit 222 may communicate with the power supply device 210 through the charging interface 223 without providing an additional communication interface or other wireless communication module, thereby simplifying implementation of the wireless charging apparatus 220. For example, the charging interface 223 is a USB interface, and the first communication control circuit 222 may communicate with the power supply device 210 based on a data cable (such as a D+ and/or D− cable) in the USB interface. As another example, the charging interface 223 may be a USB interface (such as a USB TYPE-C interface) supporting a Power Delivery (PD) communication protocol. The first communication control circuit 222 and the power supply device 210 may communicate based on the PD communication protocol.

The receiving apparatus 230 for the wireless charging signal further includes a first charging channel 233 through which the output voltage and/or the output current of the wireless receiving circuit 231 may be provided to the battery 232 for charging the battery 232.

In at least one embodiment, a voltage conversion circuit 239 may be further provided on the first charging channel 233. An input end of the voltage conversion circuit 239 is electrically connected to an output end of the wireless receiving circuit 231 for reducing the output voltage of the wireless receiving circuit 231, so as to charge the battery 232.

The voltage conversion circuit 239 may be a Buck circuit, a Boost circuit, a charge pump or a charging management circuit.

In an embodiment, since the charge pump includes a number of switching devices, heat generated by a current flowing through the switching devices is as low as almost equivalent to that generated by a current directly passing through a wire. Consequently, using the charge pump as the voltage conversion circuit 239 can not only reduce the voltage, but also reduce the generated heat. As an example, the voltage conversion circuit 239 may also be a half-voltage circuit.

In at least one embodiment, the voltage conversion circuit 239 may be configured to reduce the output voltage and/or adjust the output current of the wireless receiving circuit 231, in such a manner that the output voltage and/or the output current of the voltage conversion circuit 239 matches current charging requirements of the battery.

As mentioned above, the conversion efficiency of the voltage conversion circuit 239 is limited by a voltage difference between the input end and the output end of the voltage conversion circuit 239. If the voltage difference between the two ends of the voltage conversion circuit 239 is too large, the conversion efficiency of the voltage conversion circuit 239 may be low, such that an unconverted part of electric energy is lost in a form of heat, resulting in the serious heat generation of the voltage conversion circuit 239.

Therefore, a voltage at the input end of the voltage conversion circuit 239 cannot be too large. That is, the output voltage of the wireless receiving circuit 231 cannot be too large, and the output current of the wireless receiving circuit 231 cannot be too small.

An embodiment of the present disclosure may also set a target minimum value of the output current of the wireless receiving circuit 231. When the charging power is constant, the smaller the output current of the wireless receiving circuit 231 is, the larger the output voltage of the wireless receiving circuit 231 is. The larger the output voltage of the wireless receiving circuit 231 is, the greater the voltage difference between the input end and the output end of the voltage conversion circuit 239 is. The greater the voltage difference between the two ends of the voltage conversion circuit 239 is, the lower the conversion efficiency of the voltage reduction is, and the more serious the heat generation is. According to an embodiment of the present disclosure, setting the target minimum value of the output current of the wireless receiving circuit 231 can improve the conversion efficiency of the voltage conversion circuit 239, thereby further controlling the heat generation during the wireless charging process.

By setting the target maximum value and the target minimum value of the output current of the wireless receiving circuit 231, not only the heat generation of the wireless transmitting circuit 221 and the wireless receiving circuit 231 can be controlled, but also the voltage difference between the output voltage of the wireless receiving circuit 231 and the charging voltage of the battery can be controlled, thereby improving the charging efficiency.

In at least one embodiment, the second communication control circuit 235 may transmit the first feedback signal to the first communication control circuit 222 to instruct the first communication control circuit 222 to adjust the transmitting power of the wireless charging signal, in such a manner that the output current of the wireless receiving circuit 231 is within a preset interval. The preset interval may be an interval formed by the target maximum value and the target minimum value of the output current of the wireless receiving circuit 231.

When the output current of the wireless receiving circuit 231 is smaller than the target minimum value, the first communication control circuit 222 may increase the output current of the wireless receiving circuit 231 by controlling the power supply device 210 to reduce the output voltage. When the output current of the wireless receiving circuit 231 is greater than the target maximum value, the first communication control circuit 222 may reduce the output current of the wireless receiving circuit 231 by controlling the power supply device 210 to increase the output voltage. When the output current of the wireless receiving circuit 231 is within the preset interval, the first communication control circuit 222 may not control the power supply device 210 to adjust the output voltage.

It is to be understood that a minimum value of the output current of the wireless receiving circuit 231 is set to prevent the voltage difference between the two ends of the voltage conversion circuit 239 from being too large, which would otherwise affect the voltage conversion efficiency. Therefore, according to an embodiment of the present disclosure, a first target maximum value of the voltage difference between the two ends of the voltage conversion circuit 239 may further be set. The first communication control circuit 222 may adjust the output voltage and/or the output current of the power supply device 210 based on the voltage difference between the input end and the output end of the voltage conversion circuit 239.

In at least one embodiment, the first feedback signal may also include voltage difference information. The voltage difference information may be a value of the voltage difference between the input end and the output end of the voltage conversion circuit 239, or may be a difference between the voltage difference and the first target maximum value. The receiving apparatus 230 for the wireless charging signal may collect the voltage difference information, and transmit, based on the voltage difference information, the first feedback signal to the first communication control circuit 222.

After receiving the first feedback signal, the first communication control circuit 222 may transmit the second feedback signal to the power supply device 210 for triggering the power supply device 210 to adjust the output voltage.

For example, when the voltage difference indicated by the first feedback signal is greater than the first target maximum value, the first communication control circuit 222 may transmit the second feedback signal to the power supply device 210 for triggering the power supply device 210 to reduce the output voltage, thereby reducing an input voltage of the buck circuit.

The embodiments of the present disclosure do not specifically limit a manner in which the second communication control circuit 235 transmits the first feedback signal to the first communication control circuit 222.

For example, the second communication control circuit 235 may transmit the first feedback signal to the first communication control circuit 222 periodically. Alternatively, the second communication control circuit 235 may transmit the first feedback signal to the first communication control circuit 222 only after the output current of the wireless receiving circuit 231 does not meet the preset condition. If the output current of the wireless receiving circuit 231 meets the preset condition, the second communication control circuit 235 may not transmit the first feedback signal to the first communication control circuit 222.

In at least one embodiment, the second communication control circuit 235 may further detect the charging information of the battery 232, and transmit a third feedback signal to the first communication control circuit 222. The third feedback signal may be a feedback signal corresponding to the charging information of the battery. The charging information of the battery may include at least one of the following information: the charging voltage, the charging current, the current battery level, and the current voltage. The first communication control circuit 222 may adjust the transmitting power of the wireless charging signal based on the third feedback signal.

The charging voltage and the charging current of the battery may also refer to the output voltage and the output current on the first charging channel.

In an embodiment, a detection circuit configured to detect the output current of the wireless receiving circuit and a detection circuit configured to detect the charging information of the battery may be the same detection circuit. In another embodiment, the detection circuit configured to detect the output current of the wireless receiving circuit may be different from the detection circuit configured to detect the charging information of the battery. The two detection circuits may be configured to detect the output current of the wireless receiving circuit and the charging information of the battery, respectively.

In an embodiment, for the device to be charged, during a trickle charging process, the voltage of the battery rises continuously, and thus the charging power required by the battery increases accordingly. At this time, the transmitting power of the wireless charging signal needs to be increased to meet the current charging requirements of the battery. In a process of constant-voltage charging, the charging current of the battery decreases continuously, and thus the charging power required by the battery decreases accordingly. At this time, the transmitting power of the wireless charging signal needs to be reduced to meet the current charging requirements of the battery.

In at least one embodiment, the first feedback signal may be used to trigger the first communication control circuit 222 to adjust the transmitting power of the wireless charging signal, in such a manner that the transmitting power of the wireless charging signal matches the charging voltage and/or the charging current currently required by the battery.

The first communication control circuit 222 adjusting the transmitting power of the wireless charging signal based on the third feedback signal may refer to that the first communication control circuit 222 transmits, based on the third feedback signal, the fourth feedback signal to the power supply device 210 for triggering the power supply device 210 to adjust the output voltage and/or the output current, in such a manner that the output voltage and/or the output current of the power supply device 210 matches the charging voltage and/or the charging current currently required by the battery 232.

The output voltage and/or the output current of the power supply device 210 matching the charging voltage and/or the charging current currently required by the battery 232 may refer to that a configuration of the output voltage and/or the output current of the power supply device 210 makes the output voltage and/or the output current of the first charging channel 233 match the charging voltage and/or the charging current currently required by the battery 232 (or the configuration of the output voltage and/or the output current of the power supply device makes the output voltage and/or the output current of the first charging channel 233 meet the charging requirements of the battery 232 (including requirements of the battery 232 for the charging voltage and/or the charging current)).

It is to be understood that in an embodiment of the present disclosure, "the output voltage and/or the output current of the first charging channel 232 matches the charging voltage and/or the charging current currently required by the battery 232" includes that a voltage value and/or a current value of a direct current outputted by the first charging channel 232 is equal to a charging voltage value and/or a charging current value required by the battery 232 or within a preset floating range (for example, the voltage value rises or falls 100 millivolts to 200 millivolts, the current value rises or falls within 0.001 A to 0.005 A, etc.).

The charging process of the battery may include at least one of the trickle charging stage, the constant-current charging stage, and the constant-voltage charging stage.

The second communication control circuit 235 communicating with the first communication control circuit 222 wirelessly based on a voltage and/or a current on the first charging channel 233 detected by the detection circuit so that the first communication control circuit 222 adjusts the output power of the power supply device 210 based on the voltage and/or the current on the first charging channel 233 may lie in that during the trickle charging stage of the battery 232, the second communication control circuit 235 performs wireless communication with the first communication control circuit 222 based on the voltage and/or the current on the first charging channel 233 detected by the detection circuit 234, so that the first communication control circuit 222 adjusts the output power of the power supply device 210 in such a manner that the output current of the first charging channel 233 matches a charging current corresponding to the trickle charging stage (or in such a manner that the output current of the first charging channel 233 meets requirements of a charging current of the battery 232 in the trickle charging stage).

The embodiments of the present disclosure do not specifically limit content of the third feedback signal and content of the fourth feedback signal. The content of the third feedback signal and the content of the fourth feedback signal may be the same or different.

As an example, the content of the third feedback signal and the content of the fourth feedback signal may be the same, and both the third feedback signal and the fourth feedback signal may include the charging information of the battery. The first communication control circuit 222 may forward the charging information of the battery included in the first feedback signal to the power supply device directly, which then adjusts the output power based on the charging information of the battery.

In this case, the power supply device 210 determines an increase or a decrease of the output voltage of the power supply device 210.

The power supply device 210 may determine a current charging stage of the battery 232 based on the current battery level and/or the current voltage of the battery 232, and then determine a target charging voltage and/or a target charging current matching the charging voltage and/or the charging current currently required by the battery 232. Then, the power supply device 210 may also compare the output voltage and/or the output current of the first charging channel 233 with the above target charging voltage and/or the target charging current to determine whether the output voltage and/or the output current of the first charging channel 233 matches the charging voltage and/or the charging current currently required by the battery 232, and when the output voltage and/or the output current of the first charging channel 233 do not match the charging voltage and/or the charging current currently required by the battery 232, adjust the output power of the power supply device 210 until the output voltage and/or the output current of the first charging channel 233 matches the charging voltage and/or the charging current currently required by the battery 232.

As another example, the content of the third feedback signal and the content of the fourth feedback signal may be the same, and both the third feedback signal and the fourth feedback signal may include the adjustment information. The adjustment information may be used to trigger the power supply device 210 to adjust the output power. For example, the adjustment information may instruct the power supply device 210 to increase the output power. For another example, the adjustment information may instruct the power supply device 210 to decrease the output power. More specifically, the power supply device 210 may set different levels for the output power. Each time receiving the adjustment information, the power supply device 210 adjusts the output power by one level, until the output voltage and/or the output current of the first charging channel 233 matches the charging voltage and/or the charging current currently required by the battery 232.

In this case, the receiving apparatus for the wireless charging signal determines an increase or a decrease of the output voltage of the power supply device.

As another example, the third feedback signal may include the charging information of the battery. The first communication control circuit 222 may convert the charging information of the battery into adjustment information for increasing or decreasing the output voltage, and transmit, based on the adjustment information, the fourth feedback signal to the power supply device 210. After receiving the fourth feedback signal, the power supply device 210 may adjust, based on the adjustment information, the output voltage directly.

In this case, the first communication control circuit determines an increase or a decrease of the output voltage of the power supply device.

For example, the second feedback signal includes the charging voltage and the current voltage of the battery. After receiving the second feedback signal, the first communication control circuit 222 may determine, based on the charging voltage and the current voltage of the battery, whether the power supply device 210 increases the output voltage or decreases the output voltage. When the charging voltage of the battery is smaller than the current voltage of the battery, the first communication control circuit 222 may transmit to the power supply device 210 the adjustment information for increasing the output voltage, so as to trigger the power supply device 210 to increase the output voltage.

In at least one embodiment, the present disclosure may set different output current ranges of the wireless receiving circuit for different charging stages. For example, for the trickle charging stage, the charging current required by the device to be charged is small, and thus a small output current range can be set. For the constant-current charging stage, the charging current required by the device to be charged is large, and thus a large charging current range can be set.

In the embodiments of the present disclosure, the transmitting apparatus 220 for the wireless charging signal may adjust the output power of the wireless transmitting circuit 221 in various ways. Specifically, adjustment ways may include any one or a combination of the following two ways.

(1) When the input voltage of the wireless transmitting circuit 221 is fixed, the output power of the wireless transmitting circuit 221 may be adjusted by adjusting parameters such as a tuning frequency of a resonance circuit and/or a duty cycle of a switching tube of an inverter circuit.

(2) The output power of the wireless transmitting circuit 221 may be adjusted by adjusting the output voltage of the power supply device 210 (that is to input a voltage of the transmitting apparatus for the wireless charging signal).

In some embodiments, the transmitting apparatus 220 for the wireless charging signal may support the first wireless charging mode and the second wireless charging mode. A charging speed at which the transmitting apparatus 220 for the wireless charging signal charges the device to be charged in the first wireless charging mode is greater than a charging speed at which the transmitting apparatus 220 for the wireless charging signal charges the device to be charged in the second wireless charging mode. In other words, compared with the transmitting apparatus 220 for the wireless charging signal operating in the second wireless charging mode, the transmitting apparatus 220 for the wireless charging signal operating in the first wireless charging mode takes less time to fully charge the battery in the device to be charged of the same capacity.

The second wireless charging mode may be referred to as a normal wireless charging mode. For example, the second wireless charging mode may be a conventional wireless charging mode based on the QI standard, the PMA standard, or the A4WP standard. The first wireless charging mode may be a fast wireless charging mode. The normal wireless charging mode may refer to a wireless charging mode in which the transmitting power of the transmitting apparatus 220 for the wireless charging signal is relatively small (usually smaller than 15 W, and a commonly used transmitting power is 5 W or 10 W). In the normal wireless charging mode, it usually takes several hours to fully charge a large-capacity battery (such as a 3,000 mAh battery). However, in the fast wireless charging mode, the transmitting power of the transmitting apparatus 220 for the wireless charging signal is relatively large (usually greater than or equal to 15 W). Compared with the normal wireless charging mode, charging time required by the transmitting apparatus 220 for the wireless charging signal to fully charge a battery of the same capacity in the fast wireless charging mode can be obviously shortened, thereby increasing the charging speed.

Figure 4:
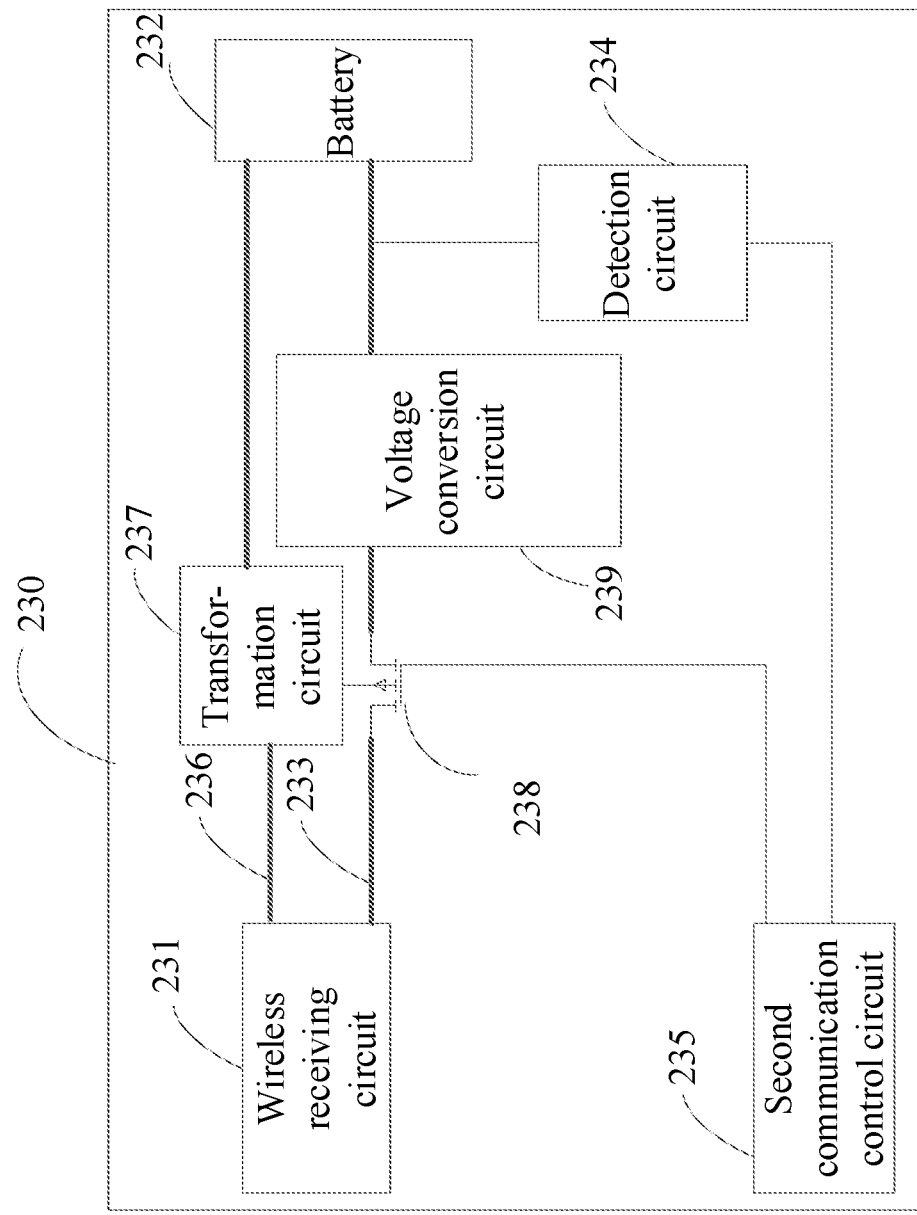
FIG. 4 is a schematic diagram illustrating a structure of a receiving apparatus for a wireless charging signal according to an embodiment of the present disclosure.

Referring to FIG. 4, in an embodiment of the present disclosure, the receiving apparatus 230 for the wireless charging signal further includes a second charging channel 236. The second charging channel 236 may be a wire. A transformation circuit 237 may be provided on the second charging channel 236 for performing voltage control on a direct current outputted by the wireless receiving circuit 231 to obtain an output voltage and an output current of the second charging channel 236, thereby charging the battery 232.

In an embodiment, the transformation circuit 237 may be used in the buck circuit for outputting constant-current and/or constant-voltage electric energy. In other words, the transformation circuit 237 may be configured to perform constant voltage and/or constant current control on the charging process of the battery.

When the second charging channel 236 is adopted to charge the battery 232, the wireless transmitting circuit 221 may use constant transmitting power to transmit an electromagnetic signal. After the wireless receiving circuit 231 receives the electromagnetic signal, the electromagnetic signal may be processed by the transformation circuit 237 into a voltage and a current that meet the charging requirements of the battery 232, and then the voltage and the current are inputted to the battery 232, thereby charging the battery 232. It is to be understood that, in some embodiments, the constant transmitting power does not necessarily mean that the transmitting power remains completely unchanged. The transmitting power may vary within a certain range. For example, the transmitting power may be 7.5 W and fluctuates by 0.5 W.

In this embodiment, the second communication control circuit 235 is further configured to compare a detected output voltage value of a rectifier circuit in the wireless receiving circuit with a set target value (which can be, for example, a set maximum voltage value that the rectifier circuit needs to output) to determine an error value. Then, the error value is transmitted to the transmitting apparatus 220 for the wireless charging signal in a form of a data packet.

In an embodiment, when the battery 232 is charged through the second charging channel 236, the transmitting apparatus for the wireless charging signal and the device to be charged may be charged wirelessly based on the Qi standard. Therefore, a data signal including the above error value may be coupled to the coil of the wireless receiving circuit 231 by means of the signal modulation to be transmitted to the coil of the wireless transmitting circuit 221, and then transmitted to the first communication control circuit. The first communication control circuit adjusts a transmitting parameter of the wireless transmitting circuit 221 such as an operating frequency of the transmitting coil based on information of an error data packet.

According to the embodiments of the present disclosure, a charging method for charging the battery 232 through the first charging channel 233 is referred to as the first wireless charging mode, and a method for charging the battery 232 through the second charging channel 236 is referred to as the second wireless charging mode. The transmitting apparatus for the wireless charging signal and the device to be charged may determine, based on handshake communication, whether to use the first wireless charging mode or the second wireless charging mode to charge the battery 232.

According to the embodiments of the present disclosure, at the wireless charging apparatus side, when the device to be charged is charged in the first wireless charging mode, the maximum transmitting power of the wireless transmitting circuit 221 may be a first transmitting power value. When the device to be charged is charged in the second wireless charging mode, the maximum transmitting power of the wireless transmitting circuit 221 may be a second transmitting power value. The first transmitting power value is greater than the second transmitting power value. Consequently, a charging speed at which the device to be charged is charged in the first wireless charging mode is greater than that in the second wireless charging mode.

In at least one embodiment, the second communication control circuit 235 may further be configured to control switching between the first charging channel 233 and the second charging channel 236. For example, as illustrated in FIG. 4, a switch 238 may be provided on the first charging channel 233. The second communication control circuit 235 may control the switching between the first charging channel 233 and the second charging channel 236 by controlling ON and OFF of the switch 238. As described above, in some embodiments, the transmitting apparatus 220 for the wireless charging signal may include the first wireless charging mode and the second wireless charging mode, and the charging speed at which the transmitting apparatus 220 for the wireless charging signal charges the device to be charged 230 in the first wireless charging mode is greater than the charging speed at which the transmitting apparatus 220 for the wireless charging signal charges the device to be charged in the second wireless charging mode. When the transmitting apparatus 220 for the wireless charging signal adopts the first wireless charging mode to charge the battery in the device to be charged 230, the device to be charged 230 may control the first charging channel 233 to operate. When the transmitting apparatus 220 for the wireless charging signal adopts the second wireless charging mode to charge the battery in the device to be charged 230, the device to be charged 230 may control the second charging channel 236 to operate.

As described above, in an embodiment, in order to alleviate the heat generation problem of coils during the wireless charging process, the charging method described in FIG. 1 to FIG. 3 may be used for the wireless charging when the first wireless charging mode is adopted.

At the side of the device to be charged, the second communication control circuit 235 may switch between the first charging channel 233 and the second charging channel 236 based on the charging mode. When the first wireless charging mode is adopted, the second communication control circuit 235 controls the voltage conversion circuit 239 on the first charging channel 233 to operate. When the second wireless charging mode is adopted, the second communication control circuit 235 controls the transformation circuit 237 on the second charging channel 236 to operate.

In at least one embodiment, the transmitting apparatus 220 for the wireless charging signal may communicate with the receiving apparatus 230 for the wireless charging signal to negotiate a charging mode between the transmitting apparatus 220 for the wireless charging signal and the receiving apparatus 230 for the wireless charging signal.

In addition to communication content described above, the first communication control circuit 222 in the transmitting apparatus 220 for the wireless charging signal and the second communication control circuit 235 in the receiving apparatus 230 for the wireless charging signal may also exchange other communication information. In some embodiments, the first communication control circuit 222 and the second communication control circuit 235 may exchange information for safety protection, abnormality detection or fault handling, such as temperature information of the battery 232, information such as indication information indicating entering overvoltage protection or overcurrent protection, and power transmission efficiency information (the power transmission efficiency information may be used to indicate power transmission efficiency between the wireless transmitting circuit 221 and the wireless receiving circuit 231).

In at least one embodiment, communication between the second communication control circuit 235 and the first communication control circuit 222 may be one-way communication or two-way communication, and is not limited in the embodiments of the present disclosure.

In an embodiment of the present disclosure, a function of the second communication control circuit may be implemented by an application processor of the receiving apparatus 230 for the wireless charging signal, thereby saving hardware costs. Alternatively, the function of the second communication control circuit may be implemented by an independent control chip, which can improve reliability of control.

In at least one embodiment of the present disclosure, the wireless receiving circuit 232 and the voltage conversion circuit 239 may be integrated in the same wireless charging chip, thereby improving an integration level of the device to be charged while simplifying implementation of the device to be charged. For example, functions of a conventional wireless charging chip can be expanded to support a charging management function.

The battery 232 in the wireless charging system according to the embodiments of the present disclosure may include one battery cell or N battery cells connected in series (N is a positive integer greater than 1). Taking N=2 as an example, the battery 232 may include a first battery cell and a second battery cell that are connected in series. Description will be made by taking the charging power being equal to 20 W and the charging voltage of a single battery cell being equal to 5V as an example. In order to meet a charging voltage requirement of two battery cells that are connected in series, the output voltage/the output current of the first charging channel 233 needs to be maintained at 10V/2 A. In this way, the wireless transmitting circuit generates an electromagnetic signal based on 10V/2 A. Correspondingly, the wireless receiving circuit converts the electromagnetic signal into an output voltage/an output current of 10V/2 A. As a current is reduced from 4 A to 2 A, the heat generated during a transmission process of electric energy will be reduced accordingly. Consequently, according to the embodiments of the present disclosure, multiple battery cells connected in series may be adopted to reduce the heat generated by the wireless transmitting circuit 221 and the wireless receiving circuit 231.

The above description is made by taking N=2 as an example. In fact, a value of N can be 3 or a positive integer greater than 3. The more battery cells are connected in series, the less heat is generated by the electric energy passing through the wireless transmitting circuit 221 and the wireless receiving circuit 231.

In an embodiment of the present disclosure, in order to ensure the charging speed and further to alleviate the heat generation problem of the receiving apparatus 230 for the wireless charging signal, an internal battery structure of the receiving apparatus 230 for the wireless charging signal is redesigned according to the embodiments of the present disclosure, and multiple battery cells connected in series with each other are introduced. Compared with a single battery cell solution, to achieve the same charging speed, a charging current required by the multiple battery cells is 1/N of a charging current required by the single battery cell (N is the number of battery cells connected in series in the receiving apparatus 230 for the wireless charging signal). That is, under a premise of ensuring the same charging speed, a magnitude of the charging current can be reduced to a great extent according to the embodiments of the present disclosure, thereby further reducing the heat generated by the receiving apparatus 230 for the wireless charging signal during the charging process.

In an embodiment of the present disclosure, the multiple battery cells may be battery cells having same or similar specifications and parameters. Battery cells with the same or similar specifications are convenient for unified management. In addition, using battery cells having the same or similar specifications and parameters can increase the overall performance and service life of the multiple battery cells.

During the charging process, the electric energy outputted by the first charging channel or the second charging channel can be used to charge the multiple battery cells connected in series. During a power supply process, the buck circuit may be adopted to reduce voltages of the multiple battery cells to provide system power to the receiving apparatus 230 for the wireless charging signal, or the single battery cell may be used to provide the system power. In addition, during the charging process, if it is needed to power the system, a path may be branched directly by the charging management circuit to supply power to the system.

In order to maintain equalization of battery levels of the multiple battery cells, the battery levels of the multiple battery cells can be equalized by an equalization circuit during charging and discharging processes. There are many ways to implement the equalization circuit. For example, a load can be connected at two ends of the battery cell to consume a battery level of the battery cell, so as to keep the battery level of the battery cell consistent with battery levels of other battery cells, such that voltages of the multiple battery cells are consistent with each other. Alternatively, the equalization may be implemented by using a battery cell with a higher battery level to charge a battery cell with a lower battery level until voltages of the multiple battery cells are the same.

As described above, the charging process of the battery may include one or more of the trickle charging stage, the constant-current charging stage, and the constant-voltage charging stage. In an embodiment of the present disclosure, in order to further increase the charging speed, a charging duration of the constant-voltage charging stage is shortened or the constant-voltage charging stage is omitted by controlling the charging voltage and the charging current. Therefore, compared with a charging process in the related art, the charging speed can be greatly improved.

In an embodiment, a limiting voltage Vn higher than a standard cut-off voltage of the battery is set, and multiple charging currents [I1, I2, I3, . . . , In] are set, where n≥1, and I1≥I2≥I3 . . . . It is to be understood that the limiting voltage Vn is related to a battery system, a material used, and the like. In some embodiments, if the standard cut-off voltage of the battery is V0, Vn can be set to V0+ΔV For example, ΔV may take a value between 0.05V and 0.1V. A value of the charging current I1, I2, . . . , In is also related to the battery system, the material used, and the like. For example, In may be 700 mA.

When the battery system is determined, a capacity of the battery is determined. When the charging voltage is equal to the limiting voltage Vn, magnitudes of charging currents at different stages can be determined based on a relationship between a charging voltage, a charging current, charging time and a battery capacity. In some embodiments, it may be set that in I1, I2, I3, . . . , In, a difference between any two adjacent charging currents is ΔI. For example, ΔI may take a value between 100 mA and 1 A.

In some embodiments, regardless of whether the first charging channel or the second charging channel described above is used, when a battery voltage is charged to the standard cut-off voltage, constant-current charging is performed on the battery with the charging current I1 until the battery voltage reaches the limiting voltage Vn. Since the constant-current charging is performed on the battery with the charging current I1, a voltage will drop after the constant-current charging stops. Therefore, the constant-current charging may be performed on the battery with the charging current I2 until the battery voltage reaches the limiting voltage Vn. The above steps are repeated, and charging may stop until the charging current In in the last step is used to charge the battery voltage to the limiting voltage Vn. Therefore, by setting the limiting voltage Vn and the charging current in each stage, the constant-voltage charging stage in the related art can be omitted, and thus the charging time can be greatly shortened.

When the battery voltage is charged to the standard cut-off voltage, the battery is charged through a plurality of charging stages. Each of the plurality of charging stages corresponds to one charging current. A charging current corresponding to any of the plurality of charging stages is greater than a charging current corresponding to a charging stage immediately following that charging stage. Each of the plurality of charging stages charges the voltage of the battery to the limiting voltage by using a charging current corresponding thereto. The limiting voltage is greater than the standard cut-off voltage of the battery. Charging stops upon completion of the plurality of charging stages.

In other embodiments, regardless of whether the first charging channel or the second charging channel described above is used, when the battery voltage is charged to the standard cut-off voltage, the constant-current charging is performed on the battery with the charging current I1 until the battery voltage reaches the limiting voltage Vn. The constant-current charging is performed on the battery with the charging current I2 until the battery voltage reaches the limiting voltage Vn. The above steps are repeated until the charging current In in the last step is used to charge the battery voltage to the limiting voltage Vn. Then, Vn is used as the charging voltage. Charging stops when preset time for constant-voltage charging or a current to be used for charging is reduced to a preset value (for example, 100 mA). In these embodiments, since the charging cut-off voltage can be increased and a duration of constant-voltage charging can be shortened, the charging time can also be greatly shortened compared with the related art.

When the battery voltage is charged to the standard cut-off voltage, the battery is charged through a plurality of charging stages. Each of the plurality of charging stages corresponds to one charging current. A charging current corresponding to any of the plurality of charging stages is greater than a charging current corresponding to a charging stage immediately following that charging stage. Each of the plurality of charging stages charges the voltage of the battery to the limiting voltage by using a charging current corresponding to that charging stage. The limiting voltage is greater than the standard cut-off voltage of the battery. The constant-voltage charging is performed on the battery at the limiting voltage. Charging stops when the charging current of the battery reaches a target constant-voltage charging cut-off current or a charging duration of the battery reaches a preset duration.

When the battery includes multiple battery cells, with the above method, it is necessary to monitor whether a voltage of each battery cell reaches the standard cut-off voltage and the limiting voltage. When a voltage of any battery cell reaches the standard cut-off voltage or the limiting voltage, a transformation operation on the charging current is performed. Alternatively, in some embodiments, a charging path of a battery cell that has been fully charged may be disconnected, while a battery cell that has not been fully charged may continue to be charged. That is, each battery cell may perform a charging operation independently in accordance with the above charging process.

Apparatus embodiments of the present disclosure are described in detail above in combination with FIG. 2 to FIG. 4. Method embodiments of the present disclosure will be described in detail below in combination with FIG. 5 to FIG. 7. The method embodiments and the apparatus embodiments correspond to each other, so reference may be made to the apparatus embodiments described above for parts that are not described in detail.

Figure 5:
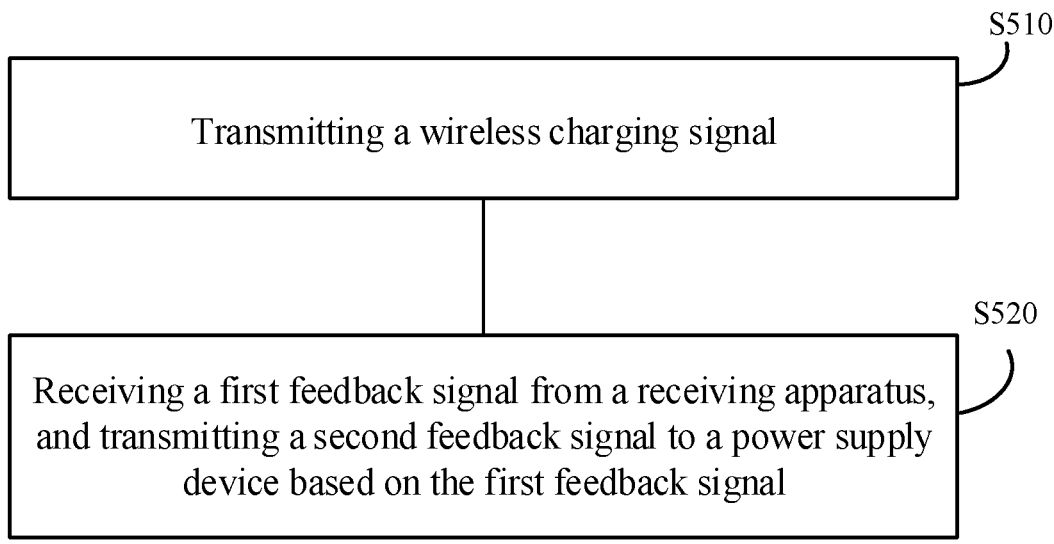
FIG. 5 is a flowchart illustrating a wireless charging method according to an embodiment of the present disclosure.

FIG. 5 is a flowchart illustrating a wireless charging method according to an embodiment of the present disclosure. The method can be applied in a transmitting apparatus for a wireless charging signal, for example, the transmitting apparatus 220 for the wireless charging signal described above. The method illustrated by FIG. 5 includes steps S510-S520.

At block S510, a wireless charging signal is transmitted.

At block S520, a first feedback signal is received from a receiving apparatus, and a second feedback signal is transmitted to a power supply device based on the first feedback signal. The first feedback signal is a feedback signal corresponding to an output current of a wireless receiving circuit. The second feedback signal is used to trigger the power supply device to adjust an output voltage and/or an output current of the power supply device.

In at least one embodiment, the first feedback signal indicates a difference between the output current of the wireless receiving circuit and a target value. The wireless charging method further includes: determining adjustment information based on the difference between the output current of the wireless receiving circuit and the target value; and transmitting the second feedback signal to the power supply device. The second feedback signal includes the adjustment information.

In at least one embodiment, each of the first feedback signal and the second feedback signal includes the adjustment information. The adjustment information is used to instruct the power supply device to adjust the output voltage and/or the output current of the power supply device.

In at least one embodiment, the wireless charging method further includes: receiving a third feedback signal from the receiving apparatus; and transmitting a fourth feedback signal to the power supply device based on the third feedback signal. The third feedback signal is a feedback signal corresponding to charging information of a battery. The charging information of the battery includes at least one of the following information: a charging voltage, a charging current, a current battery level, and a current voltage. The fourth feedback signal is used to trigger the power supply device to adjust an output power of the power supply device.

In at least one embodiment, the third feedback signal includes the charging information of the battery. The wireless charging method further includes: determining the adjustment information based on the charging information of the battery; and transmitting the fourth feedback signal to the power supply device. The fourth feedback signal includes the adjustment information.

In at least one embodiment, each of the third feedback signal and the fourth feedback signal includes the adjustment information. The adjustment information is used to instruct the power supply device to adjust the output power of the power supply device.

In at least one embodiment, the wireless charging method is applied in a transmitting apparatus supporting a first wireless charging mode and a second wireless charging mode. A charging speed at which the transmitting apparatus charges the receiving apparatus in the first wireless charging mode is greater than a charging speed at which the transmitting apparatus charges the receiving apparatus in the second wireless charging mode.

In at least one embodiment, the wireless charging method further includes communicating with the receiving apparatus to negotiate whether to use the first wireless charging mode or the second wireless charging mode for wireless charging.

In at least one embodiment, the wireless charging method further includes: performing handshake communication with the receiving apparatus; and controlling, in response to success of the handshake communication, the transmitting apparatus to use the first wireless charging mode to charge the receiving apparatus.

In at least one embodiment, the wireless charging method further includes: performing handshake communication with the receiving apparatus; and controlling, in response to failure of the handshake communication, the transmitting apparatus to use the second wireless charging mode to charge the receiving apparatus.

In at least one embodiment, the first feedback signal and the second feedback signal are transmitted in at least one of the following ways: Bluetooth, wireless fidelity, backscatter modulation, short-range wireless communication at a high carrier frequency, optical communication, ultrasonic communication, ultra-bandwidth communication, mobile communication, and a data interface.

In at least one embodiment, the high carrier frequency is 60 GHz.

In at least one embodiment, the optical communication is performed based on infrared rays.

In at least one embodiment, the mobile communication is performed based on at least one of the following communication protocols: a 5G communication protocol, a 4G communication protocol, and a 3G communication protocol.

Figure 6:
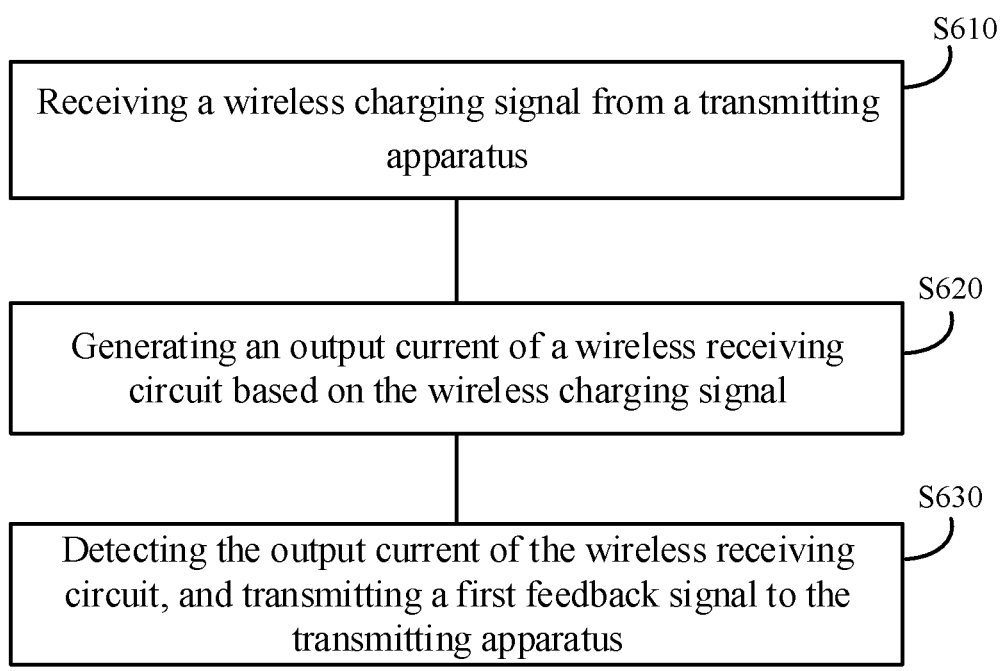
FIG. 6 is a flowchart illustrating another wireless charging method according to an embodiment of the present disclosure.

FIG. 6 is a flowchart illustrating a wireless charging method according to an embodiment of the present disclosure. The method can be applied in a receiving apparatus for a wireless charging signal, for example, the receiving apparatus 230 for the wireless charging signal described above. The method illustrated by FIG. 6 includes steps S610-S620.

At block S610, a wireless charging signal is received from a transmitting apparatus.

At block S620, an output current of a wireless receiving circuit is generated based on the wireless charging signal.

At block S630, the output current of the wireless receiving circuit is detected, and a first feedback signal is transmitted to the transmitting apparatus. The first feedback signal is a feedback signal corresponding to the output current of the wireless receiving circuit. The first feedback signal is used to trigger the transmitting apparatus to adjust a magnitude of a voltage and/or a current corresponding to transmitting power of the wireless charging signal.

In at least one embodiment, the first feedback signal indicates a difference between the output current of the wireless receiving circuit and a target value.

In at least one embodiment, the first feedback signal includes adjustment information used to instruct the transmitting apparatus to adjust the magnitude of the voltage and/or the current corresponding to the transmitting power.

In at least one embodiment, the output current of the wireless receiving circuit is used to charge a battery. The wireless charging method further includes detecting charging information of the battery, and transmitting a third feedback signal to the transmitting apparatus. The third feedback signal is a feedback signal corresponding to the charging information of the battery. The third feedback signal is used to trigger the transmitting apparatus to adjust the transmitting power of the wireless charging signal. The charging information of the battery includes at least one of the following information: a charging voltage, a charging current, a current battery level, and a current voltage.

In at least one embodiment, the third feedback signal includes the adjustment information used to instruct the transmitting apparatus to adjust the transmitting power.

In at least one embodiment, the wireless charging method further includes charging the battery using a first charging channel based on the output current of the wireless receiving circuit.

In at least one embodiment, the first charging channel has a voltage conversion circuit provided thereon.

In at least one embodiment, the voltage conversion circuit is a Buck circuit, a Boost circuit, a charge pump, or a charging management circuit.

In at least one embodiment, the wireless charging method further includes: using a transformation circuit on a second charging channel to receive an output voltage and the output current of the wireless receiving circuit, and to perform constant voltage control and/or constant current control on the output voltage and/or the output current of the wireless receiving circuit in such a manner that an output voltage and/or an output current of the second charging channel matches a charging voltage and/or a charging current currently required by the battery; and charging the battery based on the output voltage and/or the output current of the second charging channel.

In at least one embodiment, the wireless charging method further includes controlling switching between the first charging channel and the second charging channel.

In at least one embodiment, the wireless charging method further includes performing handshake communication with the transmitting apparatus, and in response to success of the handshake communication, controlling the first charging channel to operate.

In at least one embodiment, the wireless charging method further includes performing handshake communication with the transmitting apparatus, and in response to failure of the handshake communication, controlling the second charging channel to operate.

In at least one embodiment, the wireless charging method further includes: charging the battery in a plurality of charging stages when a voltage of the battery is charged to a standard cut-off voltage, in which each of the plurality of charging stages corresponds to one charging current, a charging current corresponding to any of the plurality of charging stages is greater than a charging current corresponding to a charging stage immediately following that charging stage, each of the plurality of charging stages charges the voltage of the battery to a limiting voltage by using a charging current corresponding to that charging stage, and the limiting voltage is greater than the standard cut-off voltage of the battery; and stopping charging the battery upon completion of the plurality of charging stages.

In at least one embodiment, the wireless charging method further includes: charging the battery through a plurality of charging stages when a voltage of the battery is charged to a standard cut-off voltage, in which each of the plurality of charging stages corresponds to one charging current, a charging current corresponding to any of the plurality of charging stages is greater than a charging current corresponding to a charging stage immediately following that charging stage, each of the plurality of charging stages charges the voltage of the battery to a limiting voltage by using a charging current corresponding to that charging stage, and the limiting voltage is greater than the standard cut-off voltage of the battery; and performing constant-voltage charging on the battery at the limiting voltage, and when a charging current of the battery reaches a target constant-voltage charging cut-off current or a charging duration of the battery reaches a preset duration, stopping charging the battery.

It is to be understood that the transmitting apparatus for the wireless charging signal may also adjust the transmitting power of the wireless transmitting circuit based on feedback from the receiving apparatus for the wireless charging signal on the charging voltage and/or the charging current at different charging stages, in such a manner that the transmitting power of the wireless transmitting circuit matches the charging current corresponding to the current charging stage.

In at least one embodiment, the first feedback signal is transmitted in at least one of the following ways: Bluetooth, wireless fidelity, backscatter modulation, short-range wireless communication at a high carrier frequency, optical communication, ultrasonic communication, ultra-bandwidth communication, mobile communication, and a data interface.

In at least one embodiment, the high carrier frequency is 60 GHz.

In at least one embodiment, the optical communication is performed based on infrared rays.

In at least one embodiment, the mobile communication is performed based on at least one of the following communication protocols: a 5G communication protocol, a 4G communication protocol, and a 3G communication protocol.

Figure 7:
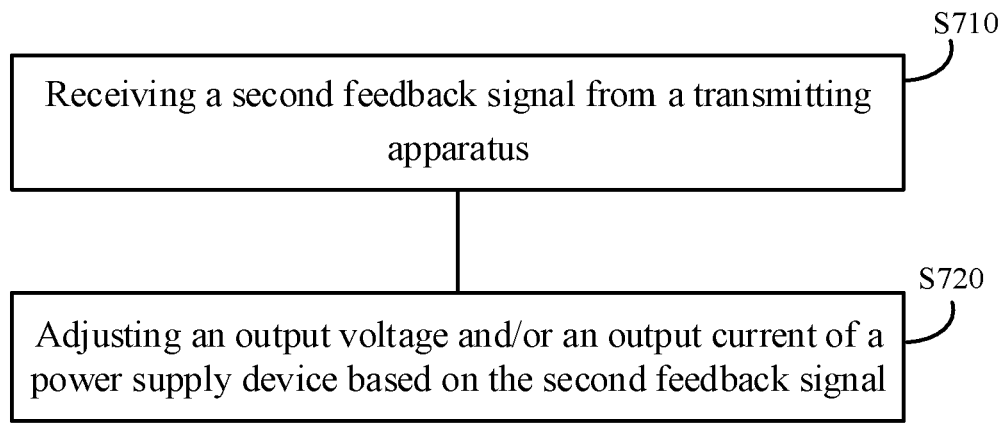
FIG. 7 is a flowchart illustrating yet another wireless charging method according to an embodiment of the present disclosure.

FIG. 7 is a flowchart illustrating a wireless charging method according to an embodiment of the present disclosure. The method may be applied in a power supply device, for example, the power supply device 210 described above. The method illustrated by FIG. 7 includes steps S710-S720.

At block S710, a second feedback signal is received from a transmitting apparatus.

At block S720, an output voltage and/or an output current of a power supply device is adjusted based on the second feedback signal. The second feedback signal is a feedback signal corresponding to an output current of a wireless receiving circuit.

In at least one embodiment, the second feedback signal includes a difference between the output current of the wireless receiving circuit and a target value. The wireless charging method further includes adjusting the output voltage and/or the output current of the power supply device based on the difference between the output current of the wireless receiving circuit and the target value.

In at least one embodiment, the second feedback signal includes adjustment information. The wireless charging method further includes adjusting the output voltage and/or the output current of the power supply device based on the adjustment information.

In at least one embodiment, the wireless charging method further includes: receiving a fourth feedback signal from the transmitting apparatus; and adjusting output power of the power supply device based on the fourth feedback signal. The fourth feedback signal is a feedback signal corresponding to charging information of a battery. The charging information of the battery includes at least one of the following information: a charging voltage, a charging current, a current battery level, and a current voltage.

In at least one embodiment, the fourth feedback signal includes the charging information of the battery. The wireless charging method further includes adjusting the output power of the power supply device based on the charging information of the battery.

In at least one embodiment, the fourth feedback signal includes the adjustment information. The wireless charging method further includes adjusting the output power of the power supply device based on the adjustment information.

In at least one embodiment, the second feedback signal is transmitted in at least one of the following ways: Bluetooth, wireless fidelity, backscatter modulation, short-range wireless communication at a high carrier frequency, optical communication, ultrasonic communication, ultra-bandwidth communication, mobile communication, and a data interface.

In at least one embodiment, the high carrier frequency is 60 GHz.

In at least one embodiment, the optical communication is performed based on infrared rays.

In at least one embodiment, the mobile communication is performed based on at least one of the following communication protocols: a 5G communication protocol, a 4G communication protocol, and a 3G communication protocol.

In the above embodiments, implementation may be made in whole or in part in software, hardware, firmware or any combination thereof. When implemented by software, they can be implemented in the form of a computer program product in whole or in part. The computer program product includes one or more computer instructions. When the computer program instructions are loaded and executed on a computer, the processes or functions described in the embodiments of the present disclosure are provided in whole or in part. The computer may be a general purpose computer, an application specific computer, a computer network, or any other programmable device. The computer instructions may be stored in a computer-readable storage medium or transmitted from one computer readable storage medium to another. For example, the computer instructions may be transmitted from one website, computer, server, or data center to another via a wired (such as coaxial cable, optical fiber, Digital Subscriber Line (DSL)) or wireless (such as infrared, wireless, microwave, etc.) connection. The computer readable storage medium may be any usable medium that can be accessed by a computer or a data storage device such as a server or a data center integrated with one or more usable medium. The usable medium may be a magnetic medium (for example, a floppy disk, a hard disk, a magnetic tape), an optical medium (for example, a Digital Video Disc (DVD)), or a semiconductor medium (for example, a Solid State Disk (SSD)), etc. The usable medium may be a magnetic medium (for example, a floppy disk, a hard disk, a magnetic tape), an optical medium (for example, a Digital Video Disc (DVD)), or a semiconductor medium (for example, a Solid State Disk (SSD)), etc.

It can be appreciated by those skilled in the art that the units and the steps of the algorithm of examples described in combination with the embodiments disclosed herein may be implemented in electronic hardware or a combination of computer software and electronic hardware. Whether these functions are executed in hardware or software depends on specific applications and design constraint conditions of technical solutions. For each specific application, professionals and technicians can use different methods to implement the described functions, but such implementation should not be considered beyond the scope of the present disclosure.

In several embodiments provided by the present disclosure, it is to be understood that, the system, apparatuses and methods disclosed in several embodiments provided by the present disclosure can be implemented in any other ways. For example, the apparatus embodiments described above can be merely exemplary. For example, the units are merely divided based on logic functions. In practical implementation, the units can be divided in other manners. For example, multiple units or components can be combined or integrated into another system, or some features can be omitted or not executed. In addition, mutual coupling or direct coupling or communication connection described or discussed can be achieved via some interfaces, and indirect coupling or communication connection between apparatuses or units may be electrical, mechanical or of other forms.

The units illustrated as separate components can be or not be separated physically, and components described as display units can be or not be physical units, i.e., can be located at one position, or can be distributed onto multiple network units. It is possible to select some or all of the units according to actual needs, for achieving the objective of embodiments of the present disclosure.

In addition, respective functional units in respective embodiments of the present disclosure can be integrated into one processing unit, or can be present as separate physical entities. It is also possible to integrate two or more units into one unit.

The above description merely illustrates specific implementations of the present disclosure, but the scope of the present disclosure is not limited by the specific implementations. Any change or replacement within the technical scope disclosed by the present disclosure that can be easily conceived by a technical person familiar with the technical field of the present disclosure should fall in the scope of the present disclosure, which is defined only by the claims as attached.

What is claimed is:

1. A transmitting apparatus, comprising:
   a wireless transmitting circuit configured to transmit a wireless charging signal; and
   a communication control circuit configured to receive a first feedback signal from a receiving apparatus, and to transmit a second feedback signal to a power supply device based on the first feedback signal,
   wherein the first feedback signal is a feedback signal corresponding to an output current of a wireless receiving circuit, and the second feedback signal is used to trigger the power supply device to adjust at least one of an output voltage and an output current of the power supply device, and
   wherein the first feedback signal indicates a difference between the output current of the wireless receiving circuit and a target value, the communication control circuit is configured to determine adjustment information based on the difference between the output current of the wireless receiving circuit and the target value, and to transmit the second feedback signal to the power supply device, and the second feedback signal comprises the adjustment information.

2. The transmitting apparatus according to claim 1, wherein each of the first feedback signal and the second feedback signal comprises the adjustment information, and the adjustment information is used to instruct the power supply device to adjust at least one of the output voltage and the output current of the power supply device.

3. The transmitting apparatus according to claim 1, wherein the communication control circuit is further configured to receive a third feedback signal from the receiving apparatus, and to transmit a fourth feedback signal to the power supply device based on the third feedback signal; and
the third feedback signal is a feedback signal corresponding to charging information of a battery, the charging information of the battery comprises at least one of the following information: a charging voltage, a charging current, a current battery level, and a current voltage, and the fourth feedback signal is used to trigger the power supply device to adjust output power of the power supply device.

4. The transmitting apparatus according to claim 3, wherein the third feedback signal comprises the charging information of the battery, the communication control circuit is configured to determine the adjustment information based on the charging information of the battery, and to transmit the fourth feedback signal to the power supply device, and the fourth feedback signal comprises the adjustment information, and
wherein the third feedback signal further comprises the adjustment information, and the adjustment information is used to instruct the power supply device to adjust the output power of the power supply device.

5. The transmitting apparatus according to claim 1, wherein the transmitting apparatus supports a first wireless charging mode and a second wireless charging mode, and wherein a charging speed at which the transmitting apparatus charges the receiving apparatus in the first wireless charging mode is greater than a charging speed at which the transmitting apparatus charges the receiving apparatus in the second wireless charging mode, and
wherein the communication control circuit is further configured to communicate with the receiving apparatus to negotiate whether to use the first wireless charging mode or the second wireless charging mode for wireless charging.

6. The transmitting apparatus according to claim 5, wherein the communication control circuit is configured to perform handshake communication with the receiving apparatus, in response to success of the handshake communication, control the transmitting apparatus to use the first wireless charging mode to charge the receiving apparatus, and in response to failure of the handshake communication, control the transmitting apparatus to use the second wireless charging mode to charge the receiving apparatus.

7. The transmitting apparatus according to claim 1, wherein the transmitting apparatus and the power supply device communicate with each other, and the transmitting apparatus and the receiving apparatus communicate with each other, in at least one of the following ways:
Bluetooth, wireless fidelity, backscatter modulation, short-range wireless communication at a high carrier frequency, optical communication, ultrasonic communication, ultra-bandwidth communication, mobile communication, and a data interface.

8. A receiving apparatus, comprising:
a wireless receiving circuit configured to receive a wireless charging signal from a transmitting apparatus, and to generate an output current of the wireless receiving circuit based on the wireless charging signal; and
a communication control circuit configured to detect the output current of the wireless receiving circuit, and to transmit a first feedback signal to the transmitting apparatus, wherein the first feedback signal is a feedback signal corresponding to the output current of the wireless receiving circuit, and the first feedback signal is used to trigger the transmitting apparatus to adjust a magnitude of at least one of a voltage and a current corresponding to transmitting power of the wireless charging signal.

9. The receiving apparatus according to claim 8, wherein the first feedback signal indicates a difference between the output current of the wireless receiving circuit and a target value.

10. The receiving apparatus according to claim 8, wherein the first feedback signal comprises adjustment information used to instruct the transmitting apparatus to adjust the magnitude of at least one of the voltage and the current corresponding to the transmitting power.

11. The receiving apparatus according to claim 8, wherein the output current of the wireless receiving circuit is used to charge a battery;
the communication control circuit is further configured to detect charging information of the battery and to transmit a third feedback signal to the transmitting apparatus; and
the third feedback signal is a feedback signal corresponding to the charging information of the battery, the third feedback signal is used to trigger the transmitting apparatus to adjust the transmitting power of the wireless charging signal, and the charging information of the battery comprises at least one of the following information: a charging voltage, a charging current, a current battery level, and a current voltage.

12. The receiving apparatus according to claim 11, further comprising:
a first charging channel configured to charge the battery based on the output current of the wireless receiving circuit,
wherein the first charging channel has a voltage conversion circuit provided thereon, and
wherein the voltage conversion circuit is a Buck circuit, a Boost circuit, a charge pump, or a charging management circuit.

13. The receiving apparatus according to claim 12, further comprising:
a second charging channel having a transformation circuit provided thereon, wherein the transformation circuit is configured to receive an output voltage and the output current of the wireless receiving circuit, to perform at least one of constant voltage control and constant current control on at least one of the output voltage and the output current of the wireless receiving circuit in such a manner that at least one of an output voltage and an output current of the second charging channel matches at least one of a charging voltage and a charging current currently required by the battery, and to charge the battery based on at least one of the output voltage and the output current of the second charging channel.

14. The receiving apparatus according to claim 13, wherein the communication control circuit is further configured to control switching between the first charging channel and the second charging channel,
  wherein the communication control circuit is further configured to perform handshake communication with the transmitting apparatus, in response to success of the handshake communication, control the first charging channel to operate, and in response to failure of the handshake communication, control the second charging channel to operate.

15. The receiving apparatus according to claim 8, further comprising:
  a plurality of battery cells connected in series with each other; and
  an equalization circuit configured to equalize voltages of the plurality of battery cells.

16. The receiving apparatus according to claim 8, wherein the communication control circuit is configured to charge the battery in a plurality of charging stages when a voltage of the battery is charged to a standard cut-off voltage, each of the plurality of charging stages corresponds to one charging current, a charging current corresponding to any of the plurality of charging stages is greater than a charging current corresponding to a charging stage immediately following that charging stage, each of the plurality of charging stages charges the voltage of the battery to a limiting voltage by using a charging current corresponding to that charging stage, and the limiting voltage is greater than the standard cut-off voltage of the battery; and
  the communication control circuit is further configured to stop charging the battery upon completion of the plurality of charging stages; or the communication control circuit is further configured to perform constant-voltage charging on the battery at the limiting voltage, and when a charging current of the battery reaches a target constant-voltage charging cut-off current or a charging duration of the battery reaches a preset duration, stop charging the battery.

17. A power supply device, comprising:
  a communication control circuit configured to receive a feedback signal corresponding to an output current of a wireless receiving circuit from a transmitting apparatus, and to adjust at least one of an output voltage and an output current of the power supply device based on the feedback signal corresponding to the output current of the wireless receiving circuit,
  wherein the feedback signal corresponding to the output current of the wireless receiving circuit comprises adjustment information and a difference between the output current of the wireless receiving circuit and a target value, and the communication control circuit is configured to adjust at least one of the output voltage and the output current of the power supply device based on the adjustment information and the difference between the output current of the wireless receiving circuit and the target value.

18. The power supply device according to claim 17, wherein the communication control circuit is further configured to receive a feedback signal corresponding to charging information of a battery from the transmitting apparatus, and to adjust output power of the power supply device based on the feedback signal corresponding to the charging information of the battery, and the charging information of the battery comprises at least one of the following information: a charging voltage, a charging current, a current battery level, and a current voltage.

* * * * *